United States Patent
Mueck et al.

(10) Patent No.: US 8,837,274 B2
(45) Date of Patent: *Sep. 16, 2014

(54) METHODS AND APPARATUS FOR MULTI-DIMENSIONAL DATA PERMUTATION IN WIRELESS NETWORKS

(71) Applicant: Apple Inc., Cupertino, CA (US)

(72) Inventors: Markus Mueck, Unterhaching (DE); Maik Bienas, Braunschweig (DE); Martin Hans, Bad Salzdetfurth (DE)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/854,864

(22) Filed: Apr. 1, 2013

(65) Prior Publication Data
US 2013/0215937 A1  Aug. 22, 2013

Related U.S. Application Data

(63) Continuation of application No. 12/474,216, filed on May 28, 2009, now Pat. No. 8,411,554.

(51) Int. Cl.
*H04J 11/00* (2006.01)
(52) U.S. Cl.
USPC ........... 370/209; 370/328; 375/219; 375/267; 375/295
(58) Field of Classification Search
None
See application file for complete search history.

(56) References Cited

U.S. PATENT DOCUMENTS

| | | | | |
|---|---|---|---|---|
| 5,377,182 A | * | 12/1994 | Monacos | 370/219 |
| 8,411,554 B2 | * | 4/2013 | Mueck et al. | 370/208 |
| 2005/0100035 A1 | * | 5/2005 | Chiou et al. | 370/412 |
| 2008/0267310 A1 | * | 10/2008 | Khan et al. | 375/267 |
| 2010/0083072 A1 | * | 4/2010 | Prasad et al. | 714/762 |

* cited by examiner

*Primary Examiner* — Chi Pham
*Assistant Examiner* — Shick Hom
(74) *Attorney, Agent, or Firm* — Fay Kaplun & Marcin, LLP

(57) ABSTRACT

Methods and apparatus that seek to increase the diversity seen in wireless communication systems by intelligently implementing a joint multi-dimensional permutation approach. In an exemplary embodiment, this is accomplished by combining the permutation of various transmitter antennas, various data streams (for example, in a MIMO configuration) and various constellation-bit mappings into a coherent multi-dimensional permutation scheme. Subsequent retransmissions in combination with an initial transmission are utilized to obtain substantial signal flattening at a receiver which increases the likelihood that retransmissions that follow detected errors will successfully convey the transmitted data to the receiver. Both open and closed-loop approaches are contemplated which take advantage of the multi-dimensional permutation schemes. In addition, embodiments utilized in the context of retransmission mechanisms such as HARQ are also contemplated.

20 Claims, 20 Drawing Sheets

EXAMPLE DEFINITION OF M1:

EXAMPLE DEFINITION OF M2:

EXAMPLE DEFINITION OF M1:

EXAMPLE DEFINITION OF M2:

EXAMPLE DEFINITION OF M3:

METHODS AND APPARATUS FOR MULTI-DIMENSIONAL DATA PERMUTATION IN WIRELESS NETWORKS

PRIORITY

This application is a continuation of and claims priority to co-owned, U.S. patent application Ser. No. 12/474,216 filed May 28, 2009 and entitled "METHODS AND APPARATUS FOR MULTI-DIMENSIONAL DATA PERMUTATION IN WIRELESS NETWORKS" (issuing as U.S. Pat. No. 8,411,554), the forgoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of wireless communication and data networks. More particularly, in one exemplary aspect, the invention is directed to methods and apparatus for multi-dimensional data permutation to increase transmission diversity in a wireless (e.g., cellular) network.

2. Description of Related Technology

Universal Mobile Telecommunications System (UMTS) is an exemplary implementation of a "third-generation" or "3G" cellular telephone technology. The UMTS standard is specified by a collaborative body referred to as the $3^{rd}$ Generation Partnership Project (3GPP). The 3GPP has adopted UMTS as a 3G cellular radio system targeted for inter alia European markets, in response to requirements set forth by the International Telecommunications Union (ITU). The ITU standardizes and regulates international radio and telecommunications. Enhancements to UMTS will support future evolution to fourth generation (4G) technology.

A current topic of interest is the further development of UMTS towards a mobile radio communication system optimized for packet data transmission through improved system capacity and spectral efficiency. In the context of 3GPP, the activities in this regard are summarized under the general term "LTE" (for Long Term Evolution). The aim is, among others, to increase the maximum net transmission rate significantly in future, namely to speeds on the order of 300 Mbps, in the downlink transmission direction and 75 Mbps in the uplink transmission direction. To improve transmission over the air interface to meet these increased transmission rates, new techniques have been specified.

MIMO (Multiple Input-Multiple Output) is one of the important techniques in LTE. MIMO is an antenna technology in which multiple antennas (up to four (4) antennas as an exemplary configuration) are used at both the NodeB (base station in LTE) and UE (mobile radio communication terminal) sides. An exemplary prior art MIMO implementation is illustrated at FIG. 1. Specifically, FIG. 1 illustrates a high-level MIMO transmission structure according to LTE that includes two independent data streams (Data Stream 1 102, Data Stream 2 104), and two antennas (Ant 1 106, Ant 2 108) at the transmitter side 110 and receiver side 112, respectively. In this example, the subcarriers may or may not be orthogonal between Ant 1 106, and Ant 2 108. At the transmitter side 110, the data symbols of each data stream are passed to the OFDM (Orthogonal Frequency Division Multiplex) modulator, where they are modulated onto the subcarriers. The block of output samples from the OFDM modulator make up a single OFDM symbol. This time-domain signal is then transmitted over the transmit antennas across the Mobile Radio Channel (MRC 1, MRC 2), At the receiver side 112 an OFDM demodulator is used to process the received signal and bring it into the frequency-domain (i.e., via Fast Fourier Transform (FFT) operation, or similar process). Ideally, the output of the OFDM demodulator will be the original symbols that were passed to the OFDM modulator at the transmitter.

In the field of telecommunications, significant research has been directed to correcting and or minimizing data corruption caused by imperfect communication channels. "Diversity schemes" are one such type of channel correction mechanism. A diversity scheme provides increased data robustness by utilizing two or more communication channels with different characteristics. Diversity schemes exploit the randomness of noise. In one illustrative scenario, the noise of each channel is uncorrelated to the noise of other channels; in contrast, the signal transmitted on each channel is correlated. Consequently, a combination of diversity streams increases the overall received signal power, without increasing the noise floor. Many diversity schemes currently exist and are used throughout the arts; such schemes include antenna diversity, coding diversity, constellation diversity, etc.

Unfortunately, existing diversity methodologies have at least one significant drawback. While the foregoing techniques may increase system performance to some degree, they do not maximally employ all the advantages offered by the full spectrum of possible diversity systems. Typical implementations only apply one diversity scheme at a time (e.g. HARQ coding diversity retransmits data which was previously "punctured" out). Generally, improved methods are needed for using the comparatively small number of diversity schemes to maximally improve signal robustness.

Accordingly, improved methods and apparatus are needed for increasing diversity in wireless communication systems, such as for example an LTE system. While individual mechanisms for providing a multitude of diversity (i.e., antenna, coding, constellation-bit mapping, etc.) modes in a wireless communication system have been contemplated, the prior art has failed to provide an intelligent approach for applying multiple diversity schemes in subsequent retransmissions. Accordingly, methods and apparatus for such intelligent combination of various diversity modes are desirable in order to improve on the retransmission performance of next generation wireless systems.

Such improved apparatus and methods would also ideally be applicable to maximize performance in both "open-loop" systems and "closed-loop" systems.

SUMMARY OF THE INVENTION

The present invention satisfies the aforementioned needs by providing inter cilia improved apparatus and methods for multi-dimensional data permutation to increase transmission diversity.

In one aspect of the invention, a method for permuting data in a wireless network is disclosed. In one embodiment, the network utilizes a retransmission scheme, and the method includes: transmitting a first plurality of data packets; receiving an indication at least partially in response to the transmitting of the first plurality of data packets; permuting the first plurality of data packets according to a first diversity scheme to form a first permuted plurality of data packets; permuting the first plurality of data packets according to a second diversity scheme to form a second permuted plurality of data packets; combining the first permuted plurality of data packets and the second permuted plurality of data packets to form a combined permuted plurality of data packets; and re-transmitting the combined permuted plurality of data packets.

In one variant, the combined permuted plurality of data packets includes a multi-dimensionally permuted plurality of data packets.

In another variant, the network includes a long-term evolution (LTE) cellular network, and the indication is an error message issued according to an LTE-compliant protocol.

In yet another variant, the first scheme is an antenna diversity scheme, and the second scheme is a constellation bit-mapping scheme. For example, the constellation bit-mapping scheme might comprise 16-QAM, 64-QAM, 256-QAM, 1024-QAM, etc. signal constellation types.

In a second aspect of the invention, a method for multi-dimensionally permuting data is disclosed. In one embodiment, the method is adapted for use in a wireless network, and includes: transmitting a plurality of data packets; receiving an error message at least partially in response to the transmitting; permuting the plurality of data packets multi-dimensionally, and re-transmitting the multi-dimensionally permuted plurality of data packets.

In one variant, the act of permuting the plurality of data packets multi-dimensionally includes: permuting the data according to an antenna diversity scheme; and permuting the data according to a constellation bit-mapping diversity scheme. The antenna diversity scheme is for example an antenna hopping diversity scheme.

In another variant, the plurality of data packets includes at least a first and a second data streams, the first and second data streams each comprising distinct services addressed to distinct user groups of the network. The permuting includes for example: (i) establishing a prioritization of the distinct user groups; and (ii) permuting at least in part according to the prioritization. In yet another variant, the distinct user groups are prioritized according to characteristics selected from the group consisting of: (i) user groups with the highest priority level; (ii) user groups with the largest number of users; and (iii) user groups with the worst reception quality characteristics.

In a third aspect of the invention, wireless communication apparatus is disclosed. In one embodiment, the apparatus includes: a processor in data communication with a memory; a radio subsystem in data communication with the processor; a plurality of antenna elements; and a data permutation apparatus. The data permutation apparatus is configured to permute a plurality of data packets according to a first and a second permutation scheme for transmission over the plurality of antenna elements.

In one variant, the first and second permutation schemes comprise a substantially simultaneous multi-dimensional permutation. The multi-dimensional permutation includes for example an antenna diversity permutation in combination with a constellation-bit mapping permutation. The plurality of data packets may also be permuted multi-dimensionally according to an open loop approach or closed loop approach (e.g., one that estimates a signal-to-noise ratio (SNR) at a receiver).

In a further variant, the permutation apparatus is computer code adapted to run on the processor.

The permutation apparatus may also comprise hardware including a programmable logic device (PLD).

In another variant, the wireless communication apparatus comprise user equipment (UE) adapted for communication with at least one base station of a long-term evolution (LTE) compliant cellular network. Alternatively, the wireless communication apparatus includes a base station adapted for communication with at least one user equipment (UE) of a long-term evolution (LTE) compliant cellular network, and the plurality of antenna elements comprise a multiple input multiple output (MIMO) antenna configuration.

In a fourth aspect of the invention, a computer readable apparatus having a storage medium with at least one computer program stored thereon. In one embodiment, the at least one computer program includes a plurality of computer executable instructions that when executed by a processor: permute a previously transmitted plurality of data packets according to a plurality of diversity schemes to increase data packet transmission diversity; and enable transmission of the permuted data packets over a wireless network.

In one variant, the plurality of diversity schemes includes an antenna diversity permutation in combination with a constellation-bit mapping permutation, and the antenna diversity permutation includes a continuous antenna hopping permutation. The continuous antenna hopping permutation includes for instance a pseudo-random permutation of a plurality of transmit antennas.

Alternatively, in another variant, the antenna diversity permutation includes a data stream/antenna permutation. The data stream antenna permutation permutes the previously transmitted plurality of data packets without physically switching a plurality of antennas.

As another alternative, the constellation-bit mapping permutation includes assigning bits within one constellation symbol to other bits within the same constellation symbol that rely on a different (e.g., higher or lower) protection level.

In another variant, the permutation is performed according to at least a pseudo-random algorithm.

Alternatively, the permutation is performed according to at least an incremental redundancy approach.

In a fifth aspect of the invention, a method for transmitting data with enhanced diversity in a wireless network is disclosed. In one embodiment, the method includes: transmitting a first plurality of data packets according to a first diversity scheme; receiving an error indication at least partially in response to the transmitting of the first plurality of data packets; and based at least in part on the error indication, transmitting the first plurality of data packets according to a second diversity scheme which is at least partly different than the first scheme.

In another embodiment, the method includes: performing a first transmission of a first plurality of data packets; receiving an error indication at least partially in response to the first transmission of the first plurality of data packets; and based at least in part on the error indication, performing a second transmission of the first plurality of data packets according to a different diversity branch to enhance the diversity when taking the first and second transmissions into account.

Other features and advantages of the present invention will immediately be recognized by persons of ordinary skill in the art with reference to the attached drawings and detailed description of exemplary embodiments as given below.

DETAILED DESCRIPTION OF THE INVENTION

Figure 1:
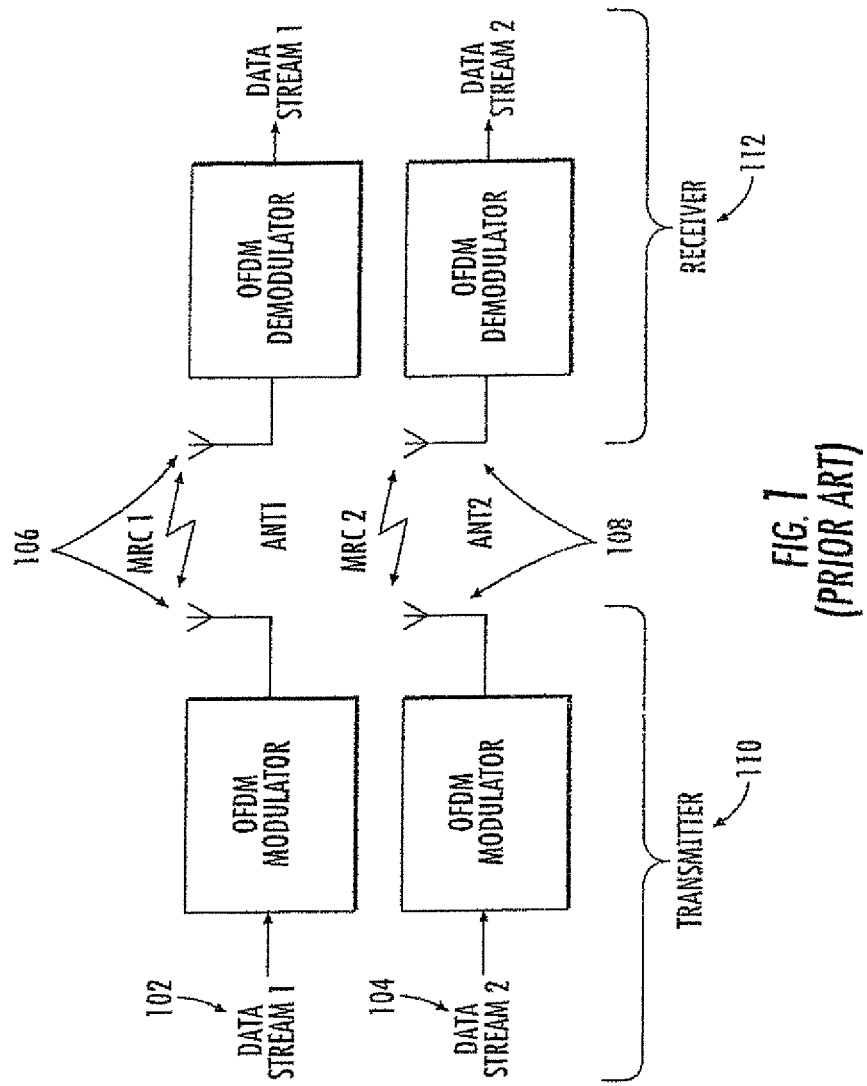
FIG. 1 is a block diagram illustrating a prior art MIMO transmission structure.

Reference is now made to the drawings wherein like numerals refer to like parts throughout.
Overview In one aspect, the present invention provides, inter alia, methods and apparatus that seek to increase the diversity seen in wireless communication systems by intelligently implementing a joint "multi-dimensional" permutation or mapping approach. In one exemplary embodiment, this enhanced diversity is contemplated in the context of retransmission mechanisms such as Hybrid-Automatic Repeat Request (HARQ) used within an LTE network. For example, a multi-dimensional permutation approach according to the invention can be accomplished by, inter alia, intelligently combining the permutation of various transmitter antennas, various data streams (e.g., in a MIMO configuration), and/or various constellation-bit mappings into a coherent, multi-dimensional permutation scheme. This scheme may also be substantially adaptive and dynamic in nature.

By taking into account not only the initial transmission but subsequent retransmissions as well, substantial signal "flattening" is advantageously observed in the receiver configured according to the invention, which increases the likelihood that retransmissions that follow detected errors will successfully convey the transmitted data to the receiver.

More generally, the term "intelligent" as used in reference to diversity schemes herein, refers to an active analysis of the effects of diversity effects. Exemplary embodiments may consider: input data bits, output bits, permutation "branches", and resulting reception error rates. Ongoing analysis actively determines future diversity behavior.

Additionally, various embodiments of the invention utilize both open and closed-loop approaches, which take advantage of the multi-dimensional permutation schemes described herein. In one such exemplary embodiment of an open-loop system, any multi-antenna pre-coding is performed without the use of channel state information (CSI). In particular, the TX retransmission step does not use any information about the channel impulse responses between the various transmit and receive antennas.

In an exemplary closed-loop system according to the invention, the efficiency of retransmissions is improved by exploiting available channel characteristic knowledge (such as CSI or, channel impulse responses) for each transmit and receive antenna.

In yet other embodiments, the mapping or permutation schemes referenced above are applied not in the context of a retransmission, but rather as part of an initial transmission (i.e., "proactive" permutation or mapping).

Detailed Description of Exemplary Embodiments

Exemplary embodiments of the present invention are now described in detail. While these embodiments are primarily discussed in the context of a UMTS wireless network, and more specifically to fourth generation UMTS LTE networks, it will be recognized by those of ordinary skill that the present invention is not so limited. In fact, the various aspects of the invention are useful in any wireless network that can benefit from the multi-dimensional permutation approach described herein. For example, it is recognized that the methodology described herein may be useful in the context of IEEE 802.16 (WiMAX) systems.

Moreover, while the various embodiments of the invention are described in terms of systems which utilize multiple-input and multiple-output (MIMO) structures, it is recognized that non-MIMO systems may also benefit from the multi-dimensional permutation (and other) techniques described herein. For example, a multiple antenna system may rotate through its antennas, only using one at a time. In another example, a single antenna system (SISO) may use constellation diversity and code diversity in combination, foregoing the benefits of antenna diversity.

Exemplary Cellular Architectures—

Figure 2:
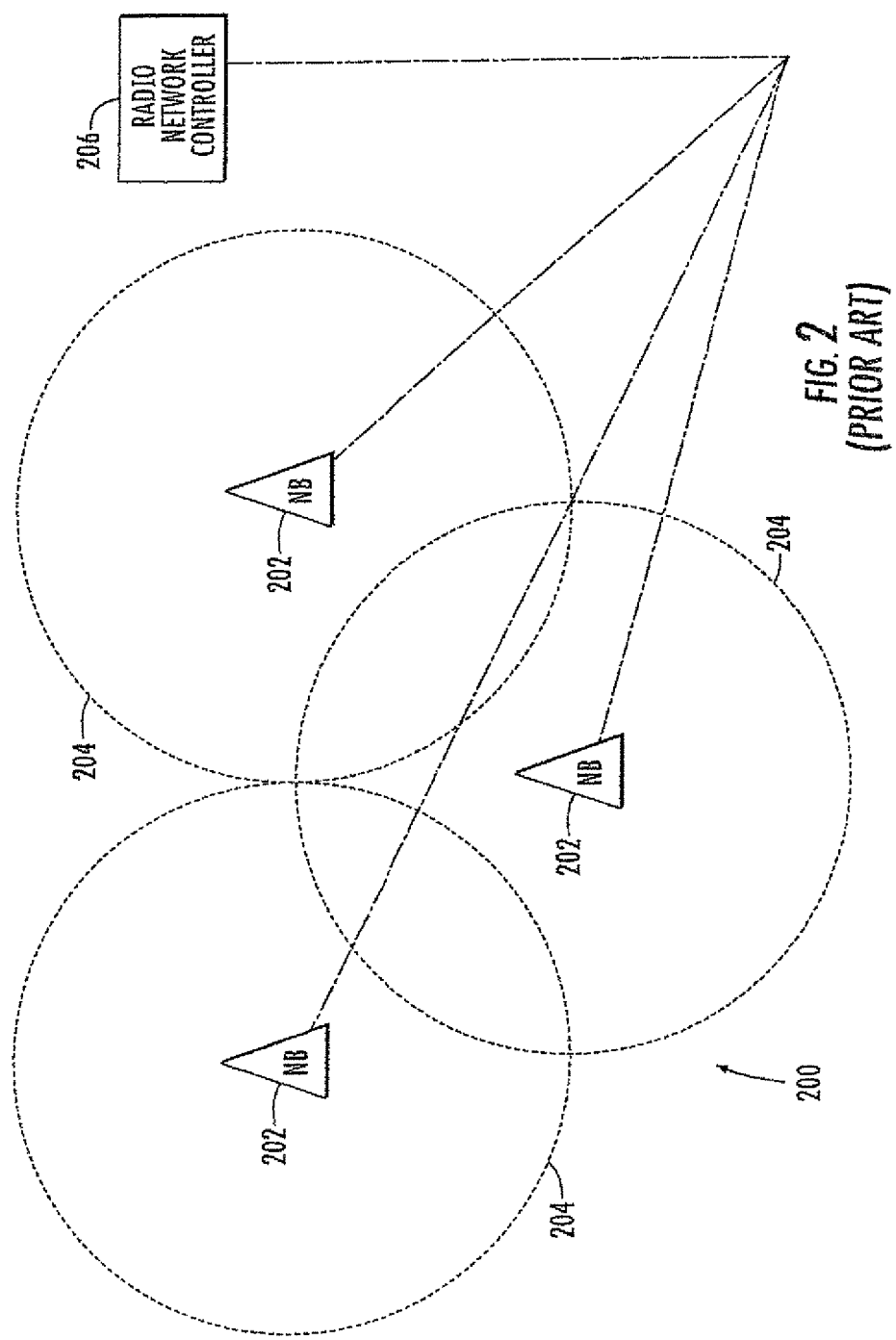
FIG. 2 is a block diagram illustrating an exemplary prior art UMTS cellular system.

FIG. 2 illustrates an exemplary prior art UMTS cellular system 200 with focus on the radio network. As is well known, a cellular radio system includes a network of radio cells each served by a transmitting station, known as a cell site or base station. The radio network provides wireless communications service for multiple transceivers (in most cases mobile). The network of base stations working in collaboration allows for wireless service which is greater than the radio coverage provided by a single serving base station. The individual base stations are connected by another network (in many cases a wired network), which includes additional controllers for resource management and in some cases access to other network systems (such as the Internet) or MANS.

In a UMTS system, a base station is commonly referred to as a "Node B". The UMTS Terrestrial Radio Access Network (UTRAN) is the collective body of Node Bs along with the UMTS Radio Network Controllers (RNC). The user interfaces to the UTRAN via User Equipment (UE), which in many typical usage cases is a cellular phone or smartphone. As used herein, the terms "client device", "end user device" and "UE" include, but are not limited to cellular telephones, smartphones (such as for example an iPhone™), personal computers (PCs), such as for example an iMac™, Mac Pro™, Mac Mini™ or MacBook™, and minicomputers, whether desktop, laptop, or otherwise, as well as mobile devices such as handheld computers, PDAs, video cameras, set-top boxes, personal media devices (PMDs), such as for example an iPod™, or any combinations of the foregoing.

The UMTS system 200 of FIG. 2 includes one or more base station towers 202 (Node Bs) that are set at various fixed geographic locations. Each of these base station towers 202 are characterized by their respective wireless coverage areas 204. The radio network controller 206 generally governs the operation of the base station towers 202.

Figure 3:
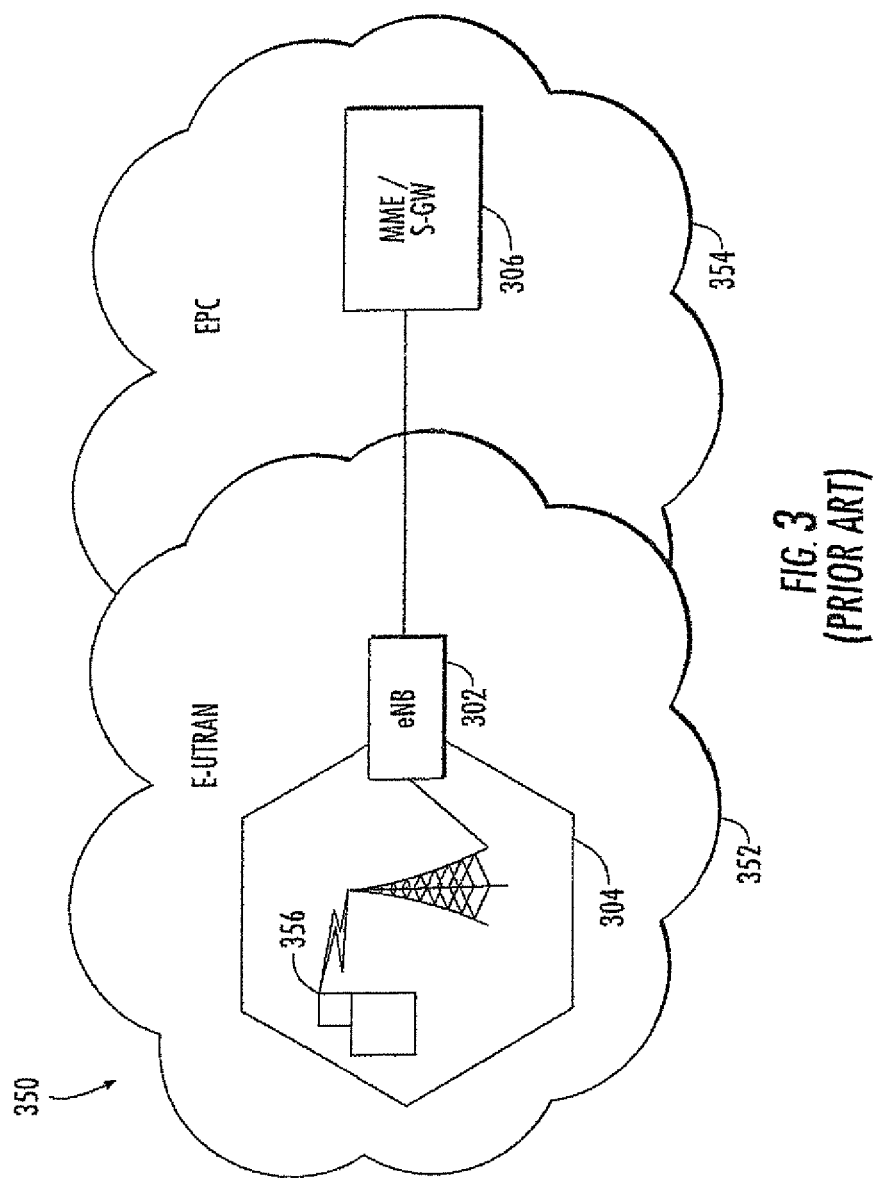
FIG. 3 is a block diagram illustrating an exemplary prior art LTE network architecture.

FIG. 3 illustrates a high-level network architecture for the fourth generation successor to the GSM/UMTS standard, also known as LTE. As seen in FIG. 3, an LTE 350 system includes the radio access network E-UTRAN 352 (Evolved UMTS Terrestrial Radio Access Network) and the core network EPC 354 (Evolved Packet Core). The E-UTRAN 352 includes one or more base transceiver stations known as eNodeB (eNBs) 302. Each eNB 302 provides radio coverage 304 for one or more mobile radio cells within E-UTRAN 352. Control and user data are transmitted between a respective eNB 302 and a UE 356 in a mobile radio cell 304 over the air interface on the basis of a multiple access method. For LTE, new multiple access methods have been specified. For the downlink transmission direction OFDMA (Orthogonal Frequency Division Multiple Access) in combination with TDMA (Time Division Multiple Access) is used. OFDMA in combination with TDMA, subsequently also called OFDMA/TDMA, is a multicarrier multiple access method in which a subscriber is provided with a defined number of subcarriers in the frequency spectrum, and a defined transmission time for the purpose of data transmission. Uplink data transmission is based on SC-FDMA (Single Carrier Frequency Division Multiple Access) in combination with TDMA.

The eNBs 302 are connected in the exemplary embodiment to the EPC 354 (Evolved Packet Core) which includes the MME (Mobility Management Entity) and the Serving Gateway (S-GW) 306. The MME is responsible for controlling the mobility of UEs 356 located in the coverage area of E-UTRAN 304, while the S-GW is responsible for handling the transmission of user data between UE 356 and network. Details of the radio access network and air interface for LTE systems are described in, inter alia, 3GPP Technical Specification TS 36.300 entitled "*E-UTRA and E-UTRAN; Overall description; Stage 2*", which is incorporated herein by reference in its entirety.

Figure 4:
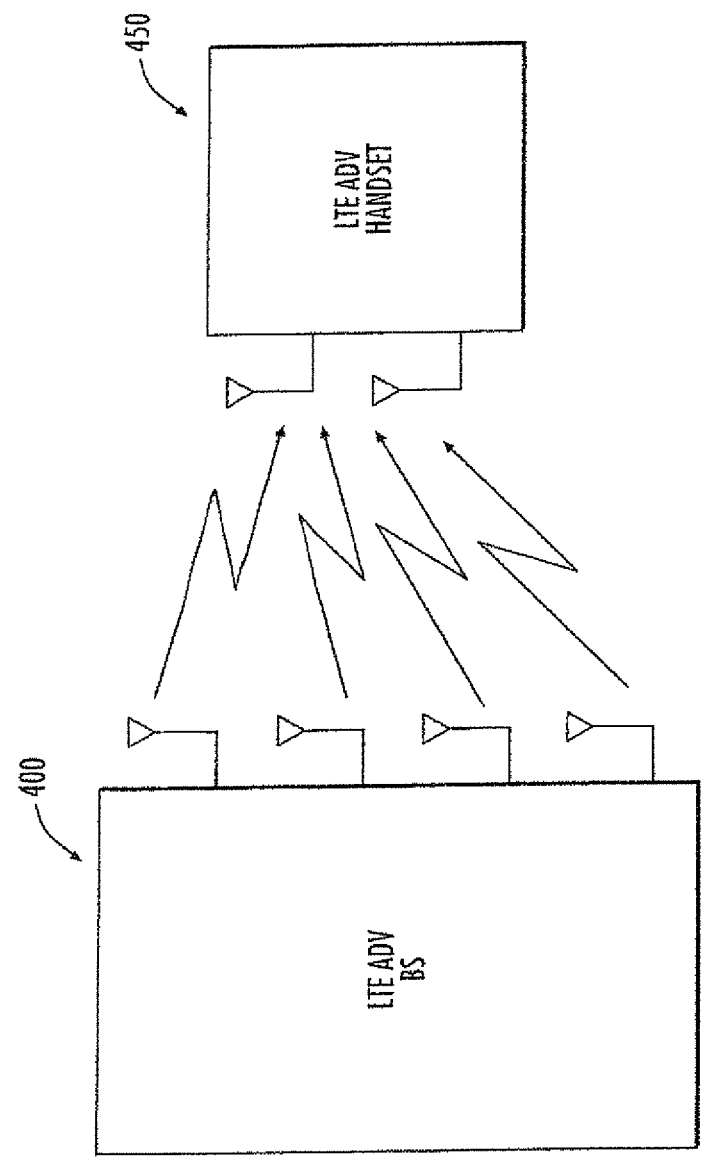
FIG. 4 is a block diagram of one embodiment of a generalized system architecture useful in implementing the methodologies of the invention.

FIG. 4 shows one embodiment of a general system architecture implementing the methodologies of the present invention. This system architecture includes a multi-antenna base station 400 (e.g., an LTE cellular base station similar to that shown in FIG. 3, yet which has been configured in accordance with the multi-dimensional diversity capability of the present invention), and a multi-antenna UE 450 (e.g., an LTE handset similar to that of FIG. 3 yet which also includes multi-dimensional diversity capability). These apparatus are described in detail below with respect to FIGS. 17 and 18. It will be recognized, however, that these apparatus are merely illustrative of the broader principles of the invention, the latter which can be applied to non-LTE networks and/or different types of network configurations (whether cellular or otherwise).

Methodology—

Figure 5:
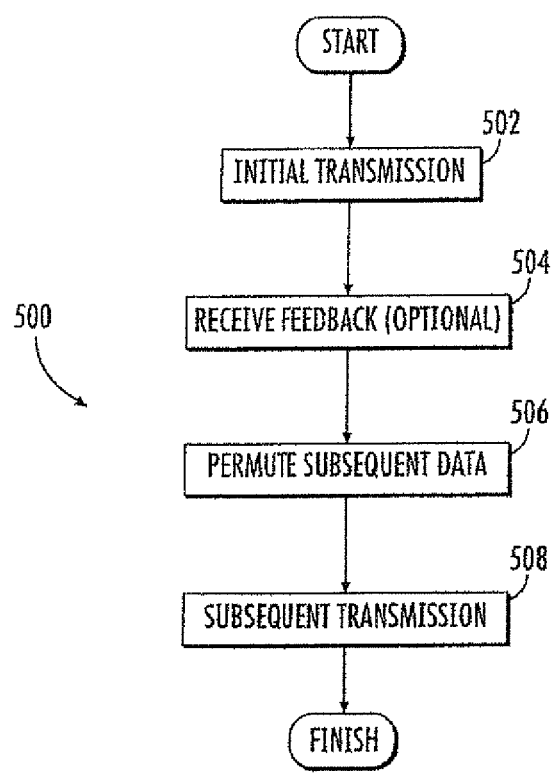
FIG. 5 is a logical flow diagram illustrating one embodiment of a generalized methodology for the multi-dimensional permutation of retransmitted data in accordance with the invention.

Referring now to FIG. 5, one embodiment of the generalized methodology 500 for implementing multi-dimensional diversity or permutation of retransmitted data is described in detail. As will be discussed further herein, a diversity scheme refers to a method for improving the reliability of a signal by utilizing two or more communication channels with differing characteristics. Diversity is useful in offsetting undesirable performance characteristics such as fading and co-channel interference, as well as avoiding intermittent and burst errors. Individual channels typically experience different levels of fading and interference, etc. due to a variety of factors such as physical environment, frequency, etc.; diversity provides multiple versions of the same signal each of which is subject to different channel noise. When two or more diversity streams are combined, each additional stream cumulatively adds signal strength (noise is uncorrelated between the streams). The concept of "diversity" is applied in exemplary embodiments of the invention within one or more of the following dimensions: (i) antenna diversity; (ii) data stream diversity; (iii) coding diversity; and (iv) constellation-bit mapping diversity, although yet other forms of diversity can be employed.

In the following discussion, the terms "transmission", "retransmission" and "subsequent transmission" are used throughout. A retransmission is a retransmission of the information which was previously transmitted. However, it should be noted that a transmission or retransmission of the same information bits may actually result in a difference in the transmitted bits (e.g., such as a difference in puncturing, or bit mapping). A subsequent transmission may be either a retransmission, or a new transmission.

At step 502, a device initiates an initial transmission of data packets across a wireless communication link. In one exemplary cellular system architecture, this initial transmission may be sent from either a UE towards a base station, or alternatively may be sent from a base station towards a UE. In alternate ad hoc network architectures, the initial transmission may be sent from a first peer to a second peer, or a mobile device to an access point (or vice versa).

As discussed in greater detail subsequently herein, the initial transmission can operate according to either a closed or open-loop paradigm (and these paradigms may in fact even be switched as part of subsequent (re)transmissions). In an open-loop approach, the parameters chosen during initial transmission will preferably seek to maximize the overall diversity of the subsequent transmissions (e.g., at the receiver) without regard to any observed information about the system. For example, in one embodiment, each subsequent transmission attempts to maximally differentiate on one or multiple degrees (e.g., antenna used, data streams, channel coding bits selected, constellation mapping, etc.) from previous transmissions. Thus, even though the transmitter has no knowledge about the effects of any single factor on performance, the receiver will have exposure to the full spectrum of diversity options, improving its overall reception.

In a closed-loop approach, the transmitter will estimate system performance in order to select a permutation approach that maximizes system performance. In an exemplary embodiment, this is accomplished by estimating the channel at the receiver so as to allow for the optimizing of system performance by selecting the best permutation pattern for the observed conditions. In channel estimates may include Channel State Information (CSI) measurements, or Signal to Noise Ratio (SNR) measurements. This pattern or selection of parameters is then taken as a permutation offset, and subsequent transmissions are performed by applying permutations to this initial parameter selection. For example, in one embodiment, the transmitter receives information about the channel impulse responses between itself and the receive antennas. The transmitter applies a "best guess" decoding approach which is likely to be used in the receiver. The transmitter uses the estimated channel that will be achieved in the receiver to set its transmission parameters; e.g., identifying the best antenna, constellation, etc.

The selection of parameters for the initial transmission at step 502 can be performed according to any number of acceptable practices. In one embodiment, the permutation pattern is pre-determined and the initial parameters are chosen at random from the pre-determined pattern. Alternatively, the initial transmission parameters are selected so as to minimize reception errors at the receiver. In embodiments in which the data streams carry distinct data flows and/or target distinct user groups, the selection of the initial parameters can be selected based on a pre-defined prioritization scheme.

At the optional step 504, the device which sent the initial transmission receives an error or other indication from the receiver which necessitates the retransmission of the initial data packet transmission. In other embodiments, the device may receive updated channel estimates (e.g., CSI, SNR, etc.) for subsequent transmissions.

At step 506, the subsequent transmission is permuted multi-dimensionally with respect to the first transmission. In an exemplary embodiment, this involves an antenna diversity scheme permutation (e.g., antenna hopping) as well as a simultaneous permutation of the data-bit/constellation-bit mapping, as described in greater detail subsequently herein. Channel coding diversity (e.g., selection of previously punctured bits, etc.) may also be used in certain cases. For instance, the permutation of data-bit/constellation-bit mapping is chosen such that at least a portion of the data bits that were mapped onto constellation bits of higher average power at the initial transmission are subsequently transmitted on constellation bits of lower average power and vice versa. In one exemplary variant to this embodiment, at each subsequent transmission, the new selection of transmit antennas, data-bit/constellation-mapping, etc. is performed quasi-randomly. However, subsequent transmissions generally should not overlap, or minimally overlap previous transmissions (or retransmissions). In one closed-loop variation, the transmitter utilizes the initial parameter selection to determine subsequent transmissions.

In one exemplary embodiment, the diversity gain is methodically maximized. In this exemplary embodiment, each input data bit "bi" (where i=0, 1, etc) is coded into multiple output hits "ci,k" (where k=0, 1, etc.). For each transmitted output bit ci,k, the permutation path is associated with its input bit bi. Furthermore, the transmitter identifies the maximum number of permutation dimensions, e.g. by combining mapping permutation, antenna permutation, etc. Each of these possible combinations creates a "diversity branch". During subsequent transmissions, the permutation branch applied in the first transmission is used to determine the optimal diversity branch for the subsequent transmission (e.g., the maximally different branch, the singularly different branch, the doubly different branch, etc.).

In closed loop implementations, the transmitter may opt to intelligently transmit, such as by using channel estimates communicated from the receiver to the transmitter. Such channel estimates enable to transmitter to optimally select the transmission scheme as a function of the propagation channel, for example, if a transmitter determines that the channel is relatively clear, the transmitter may prefer to utilize less drastic methods, e.g. singularly different branches. Alternately, if the transmitter determines that the channel is marginal, the transmitter may prefer more drastic methods, etc.

For retransmission, the transmitter may opt to intelligently retransmit, such as by using past diversity information. For example, a first retransmission may be selected to be maximally different from the transmission, and the second retransmission may be selected to be maximally different from the transmission and the retransmission, etc.

At step 508, the permuted data packets are transmitted. If it is determined that the transmission was successful, then the process continues. However if it is determined that the transmission was not successful, the data packets are again multi-dimensionally permuted at step 504 (to yet another permutation configuration different from the prior retransmission) and subsequently retransmitted (step 508). The process can be repeated until the retransmission is determined to have been successful in conveying the required information across the communication medium.

It will be appreciated that the foregoing methodology 500 can be applied incrementally and/or hierarchically if desired. As an example of an incremental approach, where a retransmission is required, a first attempt might only comprise implementing one (1) of n possible permutations dimensions (e.g., antenna diversity). If a second retransmission is required, then an increasingly aggressive scheme (perhaps also including constellation diversity and/or coding diversity) may be employed, and so forth until all received information leads to an error free decoding result. For example, two encoded bits are generated in the transmitter for each information bit to add code diversity. A first corrupted transmission included the first of the two encoded bits. A second transmission provided the second of the two encoded bits. Even though both the first and second transmissions were corrupted, the combination of the first and second transmissions may still yield a correctly decoded result. See also subsequent discussions herein regarding incremental redundancy in the context of an exemplary channel coding (e.g., puncturing) scheme, which provides a different application of "incremental" techniques.

In a hierarchical approach (which may be combined with the foregoing incremental approach if desired), the different diversity or permutation techniques are applied according to a hierarchy or order, which may be static or alternatively dynamically altered dependent upon prevailing network or link conditions.

Moreover, as previously referenced, the application of "open loop" and "closed loop" transmission/retransmission can be dynamically varied if desired. For instance, it may have been determined (e.g., anecdotally or empirically) that use of an open-looped approach on first retransmission has a high yield or success rate (along with simplicity of not having to estimate or determine receiver SNR, etc.), but that on second and subsequent retransmissions, it is more effective to use a closed loop approach (or vice versa). Hence, one embodiment of the method 500 of FIG. 5 involves switching between open and closed loop techniques dynamically.

Diversity Techniques—

Referring now to FIGS. 6-11, various exemplary techniques for implementing diversity within radio communication functions (such as the exemplary LTE-based HARQ function previously referenced) within the method 500 of FIG. 5 are now described in greater detail. These techniques include: (i) antenna diversity techniques; (ii) data stream diversity techniques; (iii) channel coding techniques; and (iv) constellation mapping techniques. It will be appreciated, however, that other techniques which create data, path or signal diversity may be used consistent with the invention as well.

(i) Antenna Diversity—

Antenna diversity utilizes multiple antennas to improve the quality and reliability of a wireless link, especially in multi-path polluted environments. Multi-path environments result as a consequence of an electromagnetic signal being reflected along multiple paths before finally being received at an antenna. Each of these reflections can introduce phase shifts, time delays, attenuations, and even distortions that can, inter alia, destructively interfere with one another at the receiving antenna. Antenna diversity mitigates the negative consequences of these multi-path environments. Antenna diversity provides a receiver several observations of the same transmitted signal. While originally contemplated as a means for improving system performance in receiving systems, antenna diversity has also proven to be a valuable tool for transmitting systems as well.

Figure 6:
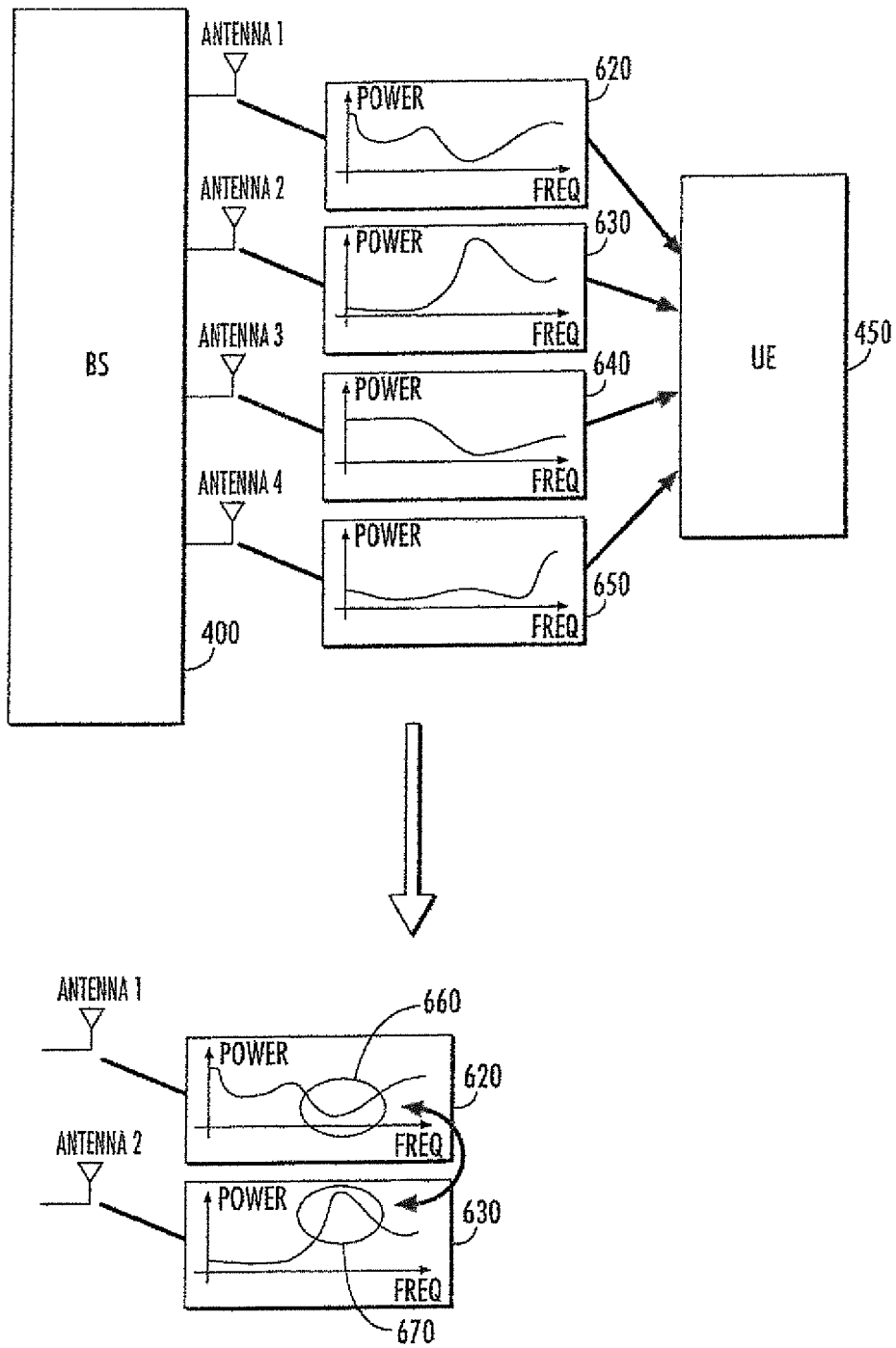
FIG. 6 is a graphical illustration of one embodiment of an exemplary MIMO configuration according to the invention, illustrating the various channel impulse responses in the frequency domain between various MIMO antennas.

An exemplary implementation of antenna diversity useful with the multi-dimensional permutation scheme(s) of the present invention is illustrated at FIG. 6. As shown, transmissions occur between a base station 400 and user equipment (UE) 610. The base station utilizes four antennas: Antenna 1; Antenna 2; Antenna 3; Antenna 4; each having differing channel impulse response characteristics 620, 630, 640 and 650, respectively. Thus, a data stream which is initially transmitted over Antenna 1, and subsequently retransmitted on Antenna 2 in a retransmission may have complementary attenuation effects that have favorable diversity characteristics. Specifically, the "dip" 660 in received signal strength in Antenna 1 620 is offset by the "peak" 670 in Antenna 2 630.

It will also be appreciated that while FIG. 6 illustrates the introduction of antenna diversity in transmission from a base station to a UE, the converse case is also possible and often desirable. That is, the reverse transmission (i.e., from UE to base station) can also be implemented with antenna diversity.

In addition to the basic antenna diversity scheme of FIG. 6, further antenna-related processing techniques may increase overall antenna diversity for use in various other scenarios. Such augmenting processes may include: antenna selection, continuous antenna hopping, and antenna permutation at retransmission, among others. Each of these augmenting processes may be intermixed and or combined freely in subsequent transmissions as well.

Antenna selection diversity only uses a sub-set of the available transmit antennas for the transmission of data, typically to maximize the signal-to-noise ratio (SNR) of the receiver. Such approaches have commonly been quasi-static (i.e., the antenna switching intervals are long and cover multiple frame durations). Antenna selection processes can be applied in both an open loop context (i.e., the transmitter determines the best antenna selection strategy without any feed-back from the receiver) as well as in a closed-loop context. In the latter case, the receiver provides recommendations to the transmitter indicating which transmit antennas should be used. The latter approach is used in systems such as for example the IEEE 802.11n standard for high-throughput WLAN systems, which leverages MEMO technology. This approach is described in *Draft Standard for Information Technology— Telecommunications and information exchange between systems—Local and metropolitan area networks—Specific requirements—Part* 11: *Wireless LAN Medium Access Control (MAC) and Physical Layer (PHY) specifications: Amendment* 4: *Enhancements for Higher Throughput*, IEEE Unapproved Draft Std P802.11n_D3.00, dated September 2007, the contents of which are incorporated herein by reference in their entirety.

Continuous antenna hopping switches between transmit antennas quickly (e.g. on the order of a few micro-seconds), based on an antenna hopping pattern. The antenna hopping pattern may be deterministic, pseudo-random, circular, etc., depending on the characteristics desired in the system. Extant methods for continuous antenna hopping are implemented within a pure open-loop technique context (i.e. the transmitter determines the best antenna hopping strategy without any feed-back from the receiver). Continuous antenna hopping is further described e.g., by Robert W. Heath. Jr., and A. J. Paulraj at *Transmit diversity using decision-directed antenna hopping*, Proc. of the IEEE hit. Conf. on Communications Mini-Conf on Comm. Theory, pp. 141-5, Vancouver, Canada, Jun. 6-10, 1999, the contents of which are incorporated herein by reference in their entirety.

Antenna permutation alters the mapping of data streams onto the transmit antennas during retransmissions to increase the diversity. However, this approach alone typically does not achieve the level of diversity provided by the continuous antenna hopping approach referenced above. In addition, antenna permutation at retransmission is often implemented in a pure open-loop approach (i.e., the transmitter determines the best antenna permutation strategy without any feed-back from the receiver). Antenna permutation at retransmission is described e.g., by T. Koike, H. Murata, S. Yoshida, *Evaluation of HARQ Scheme with Antenna Permutation and TCM Reassignment for Space-Time Transmission in Slow Nakagami-Rice Fading MIMO Channel*, IEICE Transactions on Communications, Vol. E87-B, No. 6, June 2004, the contents of which are incorporated herein by reference in their entirety.

Each of the foregoing antenna diversity schemes are adapted for known, or relatively well known channel characteristics between a transmitter and a receiver. However, some use scenarios defy conventional channel characterization. For example, in point-to-multipoint transmission scenarios, there may not be a single selection of antennas that is ideal for all target receivers. While a first antenna selection configuration benefits some receivers, a second set of antennas may benefit other receivers. Augmenting basic antenna diversity schemes with aspects of antenna selection, and antenna hopping schemes may provide better overall results. The transmitter may hop between different antenna selections for each transmission and/or retransmission to serve all of the receivers.

Furthermore, while the previous discussion of antenna diversity schemes has focused on antenna usage, it is appreciated that other antenna diversity schemes may leverage the physical qualities of antennas. Such physical antenna diversity includes pattern diversity, polarization diversity, and cyclic delay diversity.

Pattern diversity uses two or more co-located antennas, each of which possesses different radiation patterns. Pattern diversity makes use for example of directive antennas that are usually physically separated by some (often short) distance. Collectively the antennas are capable of discriminating a large portion of angle space and can provide a higher transmission gain as opposed to a single omni-directional radiator. Pattern diversity inherently occurs when using multiple beamforming antennas simultaneously.

Polarization diversity typically combines pairs of antennas with orthogonal polarizations. In some wireless systems, reflected signals can undergo polarization changes depending on system conditions. Polarization diversity can immunize a system from polarization mismatches that would otherwise cause signal fade. Additionally, polarization diversity has proven effective in radio and mobile communication base stations since it is less susceptible to the near random orientations of transmitting antennas.

Cyclic delay diversity transmits OFDM symbols via multiple distinct antennas in parallel, each antenna transmitting at a different cyclically changing time shift. The cyclical shift duration is antenna-specific. In some embodiments, the shift may be changed at each retransmission. Cyclic delay diversity is a requirement for the incipient IEEE 802.11n MIMO standard.

Lastly, it is appreciated that in one exemplary aspect of the invention, antenna diversity is "intelligently" used. While many existing systems already utilize antenna diversity as an inherent function of the radio link, such schemes do not select diversity methods based on transmission or retransmission requirements.

Figure 7:
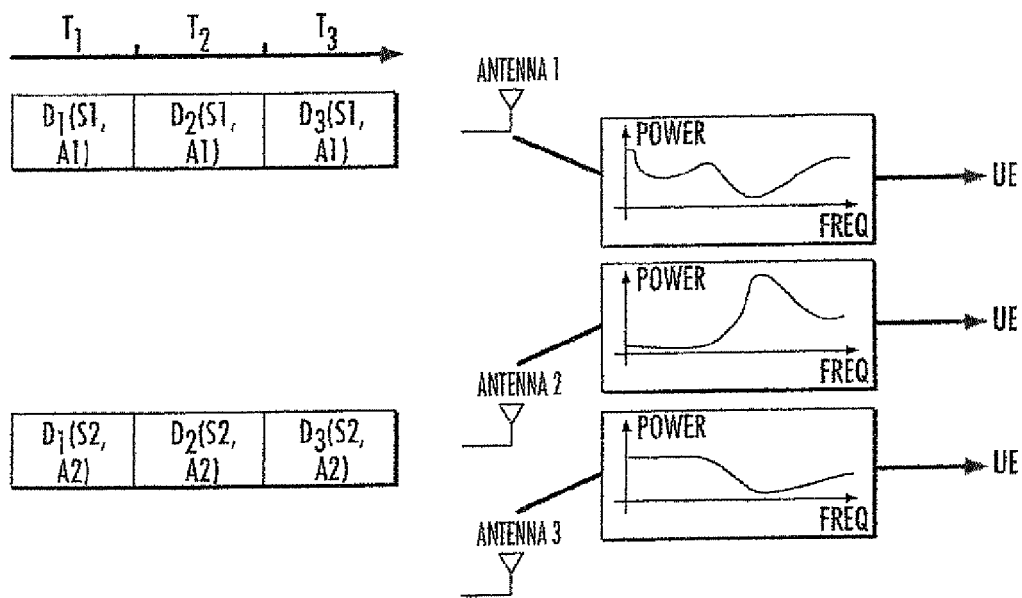
FIG. 7 is a graphical illustration of a multi-antenna data mapping scheme in an exemplary prior art MEMO configuration.

FIG. 7 illustrates a prior art approach for transmitting data via a MIMO channel (without antenna hopping). Here, two distinct data streams "S1" and "S2" are available whose data are split into data packets "$D_x$" to be transmitted over one of two given antennas (in this example, there are three (3) antennas "A1", "A2" and "A3", however the third antenna "A3" is unused). Accordingly, in the example illustrated in FIG. 7, stream "S1" is transmitted on antenna "A1", while stream "S2" is transmitted on antenna "A2". The system of FIG. 7 provides suboptimal spatial diversity; while spatial diversity is used to convey two distinct streams in parallel to the receiver, each stream is always attached to a single antenna. The performance of the system could be further improved by permuting the streams among the antennas.

Figure 8:
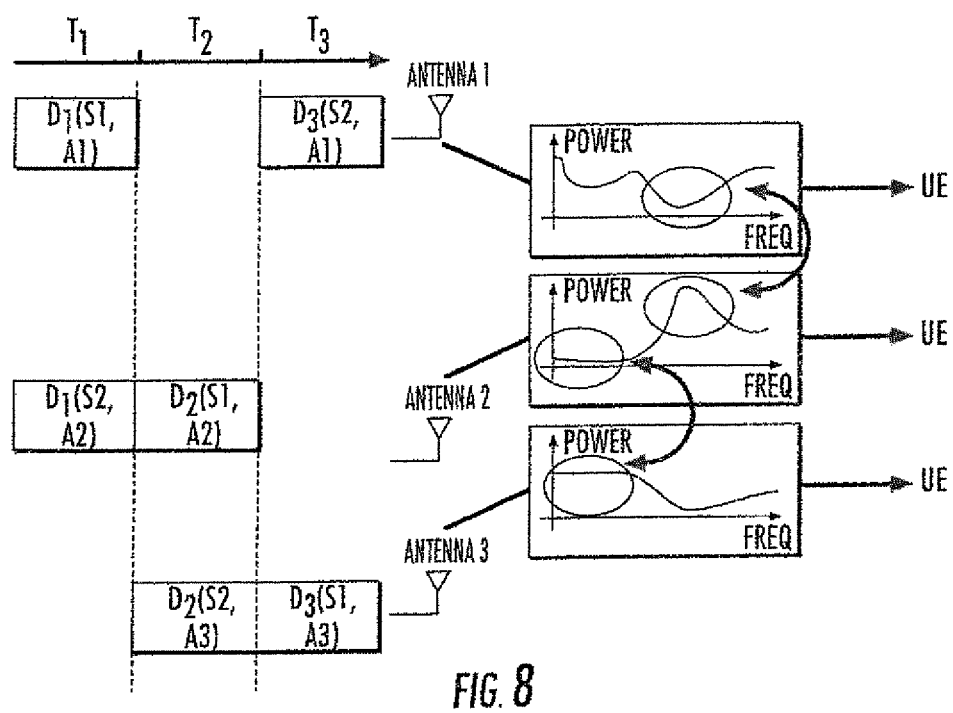
FIG. 8 is a graphical illustration of one embodiment of a multi-antenna data mapping scheme including antenna hopping, in accordance with the principles of the invention.

FIG. 8 illustrates one technique for introducing data permutations/diversity by distributing (by any adequate pattern) the data packets among all transmit antennas, as may be utilized with other diversity techniques according to the present invention. In FIG. 8, it is assumed that two distinct data streams "S1" and "S2" are available, each data stream is split into data packets "$D_x$" to be transmitted over one of the given antennas (in this example, there are three (3) antennas "A1", "A2" and "A3"). It should be noted that the index of the data packet number "$D_x$" indicates the transmission time interval index "$T_x$" of the initial transmission of the packet. Re-transmissions of the same packet will use the same initial index "$T_x$".

In one exemplary embodiment, the data contained in the distinct streams ("S1", "S2", etc.), originate from a single data source and are evenly cut into various streams. Alternatively, streams can contain data of distinct services and can thus be used independently of one another. Note also that the data packets may be of small size and contain only a small number of data symbols (for example, in the framework of IEEE Std. 802.16m, such a data packet may contain only approximately two to eight (2-8) OFDM symbols).

The foregoing approach introduces a considerable diversity gain, since the various data blocks are transmitted over distinct antennas at the different transmissions; each channel having different channel attenuations. A combination of all received signals will significantly "flatten" the received signal, leading to an improved error resistance of the system.

However the foregoing example of FIG. 8 may in certain circumstances have limitations. The approach of FIG. 8 only attributes a Cyclic Redundancy Check (CRC) to a group of data packets (e.g. D1, D2, and D3). If the receiver decodes an invalid CRC (indicating an error), a retransmission of the whole group is required in this embodiment.

(ii) Data Stream Diversity—

Figure 9:
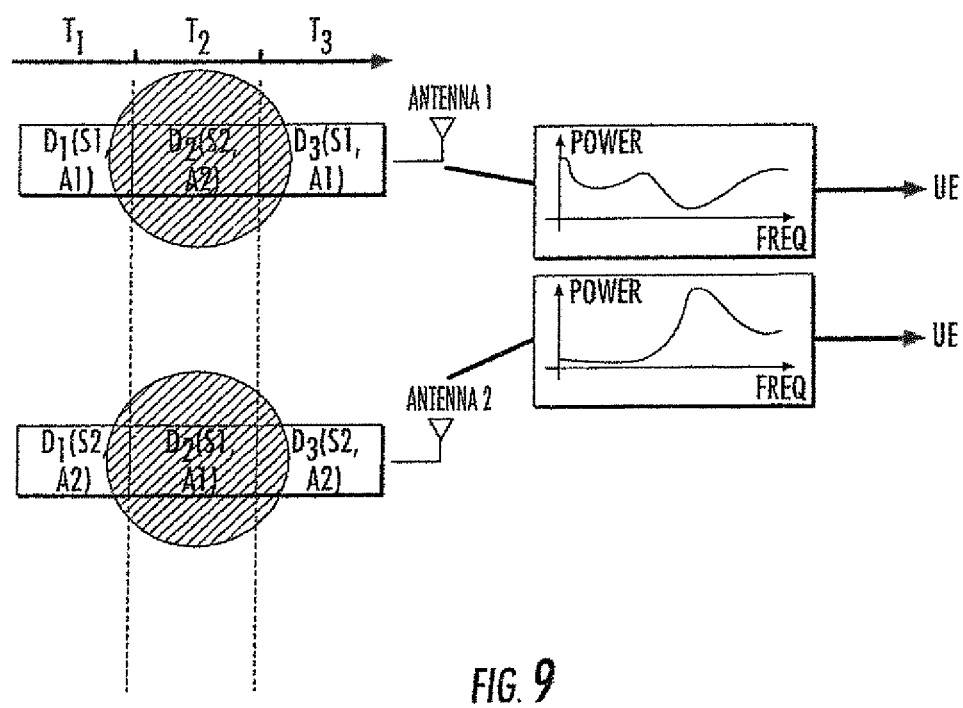
FIG. 9 is a graphical illustration of one embodiment of a data stream permutation applied over various antennas in an exemplary MIMO configuration in accordance with the invention.

FIG. 9 illustrates one implementation of the processing technique of stream/antenna permutation, useful with the present invention. In this context, the data streams are permuted over various transmit antennas; however, there is no physical switching of the antennas as is present in the continuous antenna hopping approaches of FIG. 8. This scheme transmits data packets associated with a given stream on distinct antennas during subsequent transmissions (similar to the continuous antenna hopping approach of FIG. 8). The inherent diversity gain is smaller compared to continuous antenna hopping diversity (a smaller number of uncorrelated communication channels are available); however, the implementation of stream/antenna permutation is significantly simpler and more cost effective.

(iii) Coding Diversity—

Coding diversity refers to the alteration or variation of channel coding applied for example to a channel encoding or error correction algorithm. As is well known, data bits being transmitted may be encoded using different numbers of symbols (i.e., "rate") and different coding schemes for purposes of e.g., redundancy or error correction.

One such code diversity mechanism for wireless communication systems is commonly referred to as Hybrid-Automatic Repeat Request (HARQ). During HARQ operation, detected errors in the received bit stream trigger a not-acknowledge (NAK) response, causing the transmitter to subsequently retransmit supplemental information. There are two common types of HARQ operation: (i) "Chase Combining" which retransmits the previously sent data, and (ii) "Incremental Redundancy" which transmits data that differs from the corrupted data. Common implementations of incremental redundancy systems may transmit previously punctured data, such that the receiver can exploit additional redundancy for a forward error correction (FEC) based decoding approach (i.e., the data that was "punctured" or omitted in previous transmissions is sent during a first/second/third retransmission). The incremental redundancy approach increases the available coding diversity, and may boost the overall system performance.

In another example of coding diversity, transmissions may alter the actual coding rate of subsequent transmissions. For example, a first transmission uses a ½ rate encoder (i.e., it generates two output bits for every input bit). Subsequent transmissions use a different ⅓ rate encoder (i.e., it generates three output bits for each input bit).

(iv) Constellation-Bit Mapping Diversity—

Figure 10:
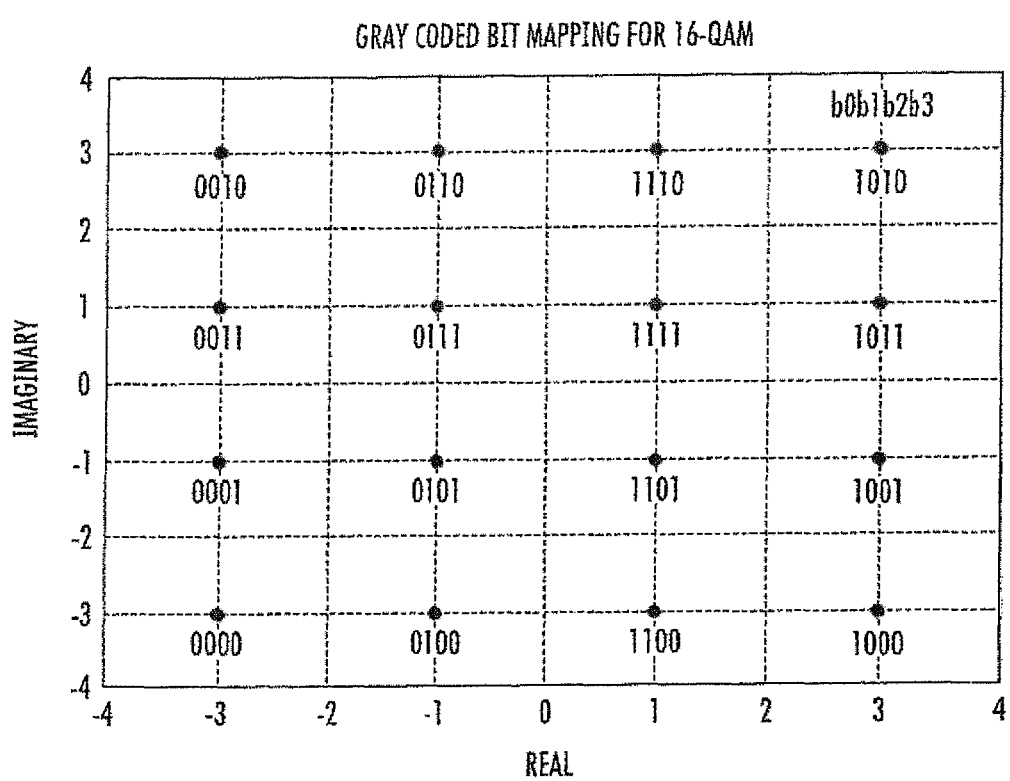
FIG. 10 is a graphical illustration of a gray-coded bit mapping for a 16-QAM constellation in accordance with one embodiment of the invention.

Referring now to FIG. 10, an exemplary 16-QAM constellation mapping diagram is illustrated, representing a "constellation" for a digital modulation scheme in a two-dimensional scatter diagram with a real and complex axis. Constellation-bit mapping diversity exploits the asymmetry that often exists with different signal constellation types, such as 16-QAM, 64-QAM, 256-QAM, 1024-QAM, etc. In most constellations, the error resistance of the information bits are not equal. This is due to the difference in power levels between subsets of constellation points. For example, upon careful examination of FIG. 10, it is apparent that bits b0 and b2 delineate halves of the overall constellation (left/right, top/bottom respectively), whereas bits b1 and b3 are spread throughout. Accordingly, errors in interpreting bits b0 and b2 generally only occur at the axis (e.g., the borders between either of the halves). Conversely, b1 and b3 are much more susceptible to errors.

In one aspect of the invention, constellation diversity is introduced to change the effects of noise for subsequent transmissions. Specifically, the differential in average power between bits can be exploited to create multiple constellations. In one embodiment (e.g., in the context of an exemplary HARQ transmission of the type described elsewhere herein), permutations for the HARQ process which invert the mapping of information bits to constellation bits with more/less average power levels during subsequent transmission are included.

Constellation diversity is applicable for both chase combining and incremental redundancy. Chase combining schemes transmit the same information for each transmission. In one exemplary chase combining scenario, if a bit was previously transmitted as a "low power" QAM bit, then it is subsequently transmitted as a "high power" QAM bit (and vice versa). Similarly, in one exemplary incremental redundancy scenario, a ½ rate convolutional coder is used to provide two output bits for each input bit. In the first transmission, if the first output bit is transmitted as a "low power" QAM bit, then the retransmission of the second output bit is transmitted as a "high power" QAM bit (and vice versa).

Figure 11:
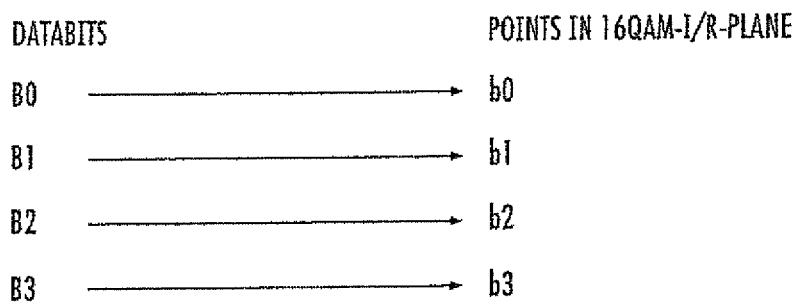
FIG. 11 is a graphical illustration of one embodiment of the technique of mapping of data bits onto points in a 16-QAM imaginary/real plane (for both initial transmission and retransmission) in accordance with the invention.
Figure 11:
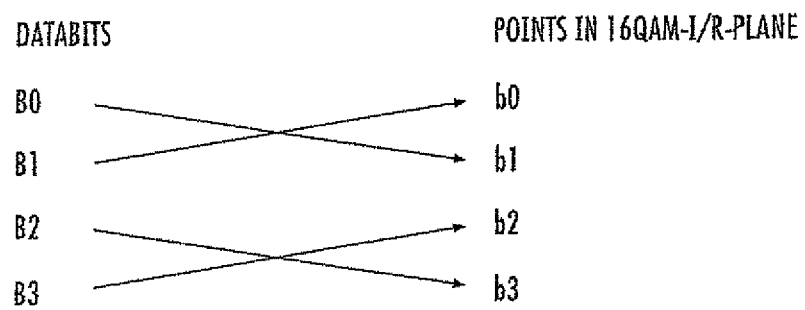

FIG. 11 illustrates one such exemplary constellation diversity bit permutation process. During initial transmission (i.e., mapping strategy "$M_1$"), the Data Bits B0, B1, B2 and B3 are mapped onto points b0, b1, b2, b3, respectively in the 16-QAM imaginary/real plane. During retransmission, this mapping strategy is altered (i.e., mapping strategy "$M_2$" implemented) such that Data Bits B0, B1, B2 and B3 are now mapped onto points b1, b0, b3, b2, respectively. With these two mapping strategies, there will be a number of data bits mapped onto constellation bits with higher (or lower) power at the initial transmission. At the retransmission, however, this will be inverted; i.e., data bits that were mapped onto constellation bits with higher (or lower) average power in the first transmission are now mapped onto constellation bits with lower (or higher) average power, respectively. A combination of both received signals (i.e., the initial transmission with mapping strategy $M_1$ and the retransmission with mapping strategy $M_2$) will thus improve the error resistance of the scheme vis-á-vis constellation-bit mapping diversity.

Figure 10A:
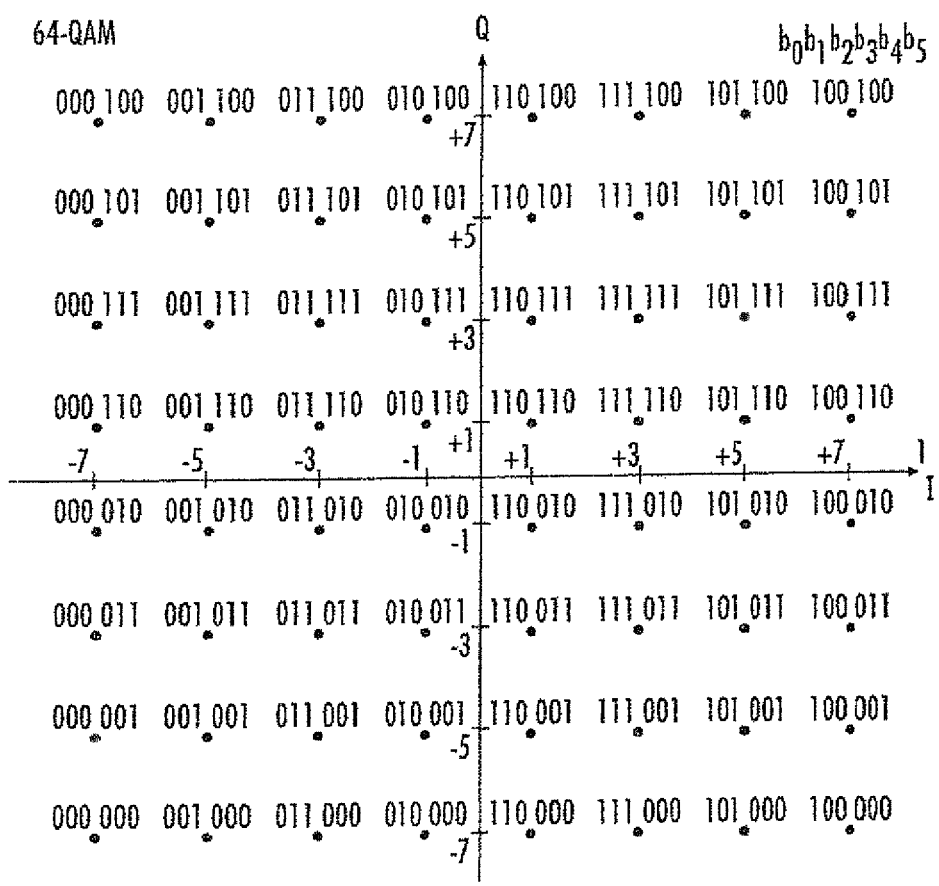
FIG. 10A is a graphical illustration of an exemplary 64-QAM constellation useful with the present invention.
Figure 11A:
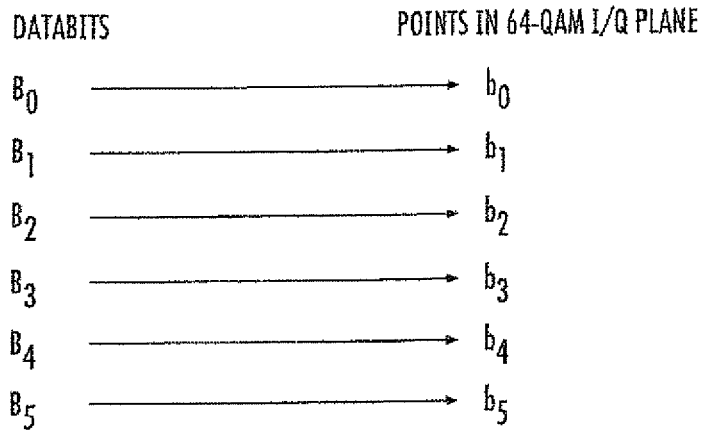
FIG. 11A is a graphical illustration of another exemplary embodiment of a constellation diversity bit permutation process according to the invention.
Figure 11A:
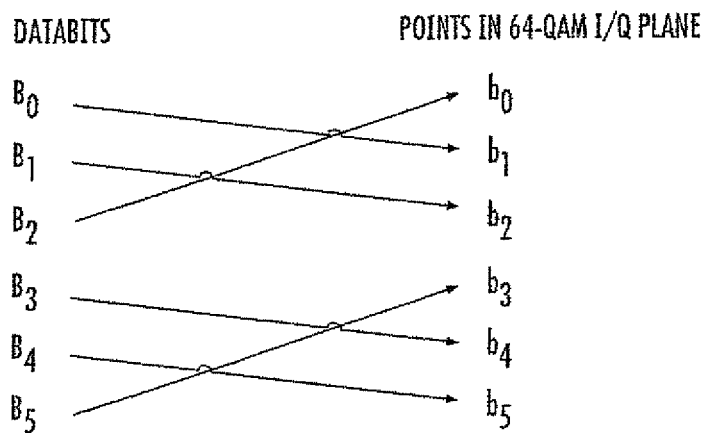
Figure 11A:
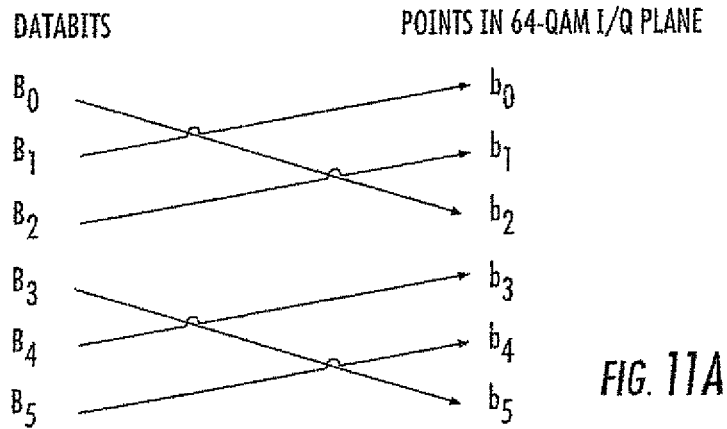

FIGS. 10A and 11A illustrate a second exemplary 64-QAM constellation, and a constellation diversity bit permutation process respectively. During initial transmission (i.e., mapping strategy "$M_1$"), the Data Bits B0, B1, B2, B3, B4, B5, and B6 are mapped onto points b0, b1, b2, b3, b4, b5, b6 respectively in the 64-QAM imaginary/real plane. During a first retransmission, this mapping strategy is altered (i.e., mapping strategy "$M_2$" implemented) such that Data Bits B0, B1, B2, B3, B4, B5, and B6 are now mapped onto points b2, b0, b1, b5, b3, b4 respectively. During a second retransmission, this mapping strategy is shifted again (i.e., mapping strategy "$M_3$" implemented) such that Data Bits B0, B1, B2, B3, B4, B5, and B6 are now mapped onto points b1, b2, b0, b4, b5, b3 respectively. With these three mapping strategies, there will be a number of data bits mapped onto constellation bits with higher (b0, b3), moderate (b1, b4), and lower power (b2, b5) at the initial transmission. During each subsequent retransmission, however, the data bits are mapped to different power level constellation bits, thereby improving overall constellation diversity. As is appreciated the number of possible constellation permutation schemes increase with higher order constellations.

In the foregoing examples, data-bit/constellation-bit mappings are adapted to accommodate the power characteristics for each constellation position. In other constellations, various other diversity schemes may apply. For example, some constellations have normalized the power distribution for each information bit, thus simply swapping constellation-bit mappings would not provide additional constellation diversity on an average power basis. Even so, alternate mapping schemes may be useful to scramble symbol to symbol effects, i.e. to reduce consecutive runs of similar symbols. For example, a consecutive run of three or four symbols within one quadrant of the constellation may have hysteresis effects on subsequent symbols. Accordingly, alternate constellations may reorganize the symbols of each quadrant, evenly distributing them throughout the constellation.

As with the other diversity schemes, many existing systems already utilize constellation diversity as an inherent function of the radio link. However, such extant constellation diversity schemes do not select diversity methods for each transmission, or retransmission. Intelligent diversity techniques permute each subsequent transmission differently, to maximize the overall diversity.

Exemplary Implementation—Hybrid ARQ (HARQ)—

In the specific example of an LTE network (FIG. 3 above); the Hybrid Automatic Repeat Request mechanism previously referenced is a method for backward error correction for both full Frequency Division Duplex (FDD) and half duplex FDD operation. Each transmission of data (control or user data in uplink (UL) and downlink (DL)) in a transport block within a subframe is positively or negatively acknowledged by the receiver. If the transmission of data is successfully received, the sender is expected to send a new data block in the next related subframe; if it is not successfully received, the sender is expected to re-transmit the data block in the next related subframe.

Current standards for LTE specify a fixed time interval between data transmission and acknowledgements, and between acknowledgements and re-transmissions. The receiver must acknowledge a received subframe n; in subframe n+4 (i.e. four subframes later). Similarly, after an UL transmission in subframe n, the eNodeB is expected to acknowledge the UL data reception in subframe n+4. For unsuccessful transmissions, the UE is expected to retransmit the data in subframe n+8. Additional time requirements for half-duplex FDD are necessary due to time dependencies of HARQ processing.

The aforementioned timing requirements are required in both full duplex and half duplex operation. Accordingly, LTE half duplex operation ensures that transmissions in the UL and DL are carefully switched, so that for each transmission the related acknowledgements and retransmissions can occur with the fixed time relation. In other implementations of networks utilizing HARQ processing, the time requirements may substantially differ.

Furthermore, while HARQ is an example of an error correction scheme having distinct time requirements, other schemes may require separate or additional time constraints (e.g., real-time or QoS-related data demands of the type well known in the art, such as streaming video), or no significant time constraints at all (e.g., trickle type, or swarming type downloads).

In one particular embodiment of the invention, diversity mechanisms may be used to maximize the effectiveness of the foregoing HARQ retransmissions (which already provide code diversity). Specifically, as noted above, the concept of "diversity" can be applied to HARQ communications within any one of the foregoing diversity "dimensions". This is accomplished, in one embodiment, by combining the permutation of various transmitter antennas (FIG. 8), various data streams (FIG. 9) and/or various constellation-bit mappings (FIGS. 10 and 11) into a coherent multi-dimensional permutation scheme. Specific permutation patterns are described subsequently herein which considerably increase the level of diversity over conventional single-dimension permutation schemes.

In order to more clearly illustrate this efficient and "intelligent" combination of permutation schemes for the retransmission phases, certain notation and assumptions are used herein. Specifically, user data is assumed to be organized in various streams "$S_1$, $S_2$, etc."; each stream represents one coherent collection of data segments, which may or may not be sequentially ordered. Data may be split from a smaller number of sources into a greater number of streams, or vice versa (i.e., merging of streams). In one exemplary data stream usage, two distinct streams may be assigned for transmission on distinct transmission antennas (see discussion of data stream diversity above).

In another example, each stream may contain data for different services. In this case, various services are provided simultaneously to one or more users. The user can then choose to decode only the stream that carries information that is of pertinent interest to the user.

In yet another example, the aforementioned incremental redundancy technique may provide a first stream carrying basic data (e.g., video data), which if decoded alone, would allow the viewing of the video at a low quality. If additional streams are decoded, the video quality improves with each newly added stream. In such applications, the user may trade-off between decoding complexity and video quality.

In addition, in one exemplary embodiment, the user data bits are mapped onto the constellation (such as e.g. 16-QAM, 64-QAM, 256-QAM, 1024-QAM, etc.) by using the given data-bit/constellation-bit mapping "$M_1$, $M_2$, etc." as detailed above.

Thus, the notation used throughout this document specifies the splitting of user data into packets. The following expression is of the form: $D_x$ ($M_a$, $S_b$, $A_c$), where x=1, . . . , P, represents the packet time slot number ($T_x$) with a total of "P" packet time slots, "$M_a$" represents the data-bit/constellation-bit mappings (for example, in the context of 16-QAM, two power levels exist for the various bits, so we use constellation-bit mappings "$M_1$" and "$M_2$"), "$S_b$" represents the various data streams (stream number "b") and "$A_c$" represents the transmit antenna (antenna number "c").

As an example, data from a single source is split into two streams (assuming that two transmit antennas are used simultaneously). Furthermore, it is appreciated that the system may underutilize available antennas. For example, in an embodiment that uses antenna hopping, there are typically more antennas than power amplifiers. Subsequently, only a subset of all available antennas is used for transmission at any given instant in time.

Accordingly, $D_1$ ($M_1$, $S_1$, $A_1$) would signify that the data at the first time slot (DA is selected from the first stream ($S_1$), obeys the first constellation map ($M_1$), and is transmitted over the first antenna ($A_1$). Likewise, $D_1$ ($M_2$, $S_2$, $A_2$) would signify that the data at the first time slot ($D_1$), is selected from the second stream ($S_2$), obeys the second constellation map ($M_2$), and is transmitted over the second antenna ($A_2$). The need for such complex notation will become apparent when at the second time slot, the corresponding data can be chosen to be $D_2$ ($M_2$, $S_1$, $A_2$) and $D_2$ ($M_1$, $S_2$, $A_3$), respectively. The data packets "Dx(Ma, Sb, Ac)" may be of arbitrary size.

In yet another exemplary embodiment, streams "$S_1$" and "$S_2$" represent distinct services that are addressed to distinct user groups. In this distinct services embodiment, it is desirable to use the most robust set of degrees of freedom ("$M_a$, $S_b$, $A_c$") for the initial transmission such that a prioritized user group is transmitted at the highest level of reliability, i.e. on the antenna(s) with the best channel impulse response characteristics and using the modulation mapping onto the constellation bits with the highest power levels. Characteristics for prioritizing user groups could include: (1) user groups with the highest priority level; and/or (2) user groups with the largest number of users; and/or (3) user groups with the worst reception quality characteristics.

Specific Permutation Pattern Examples—

Figure 12:
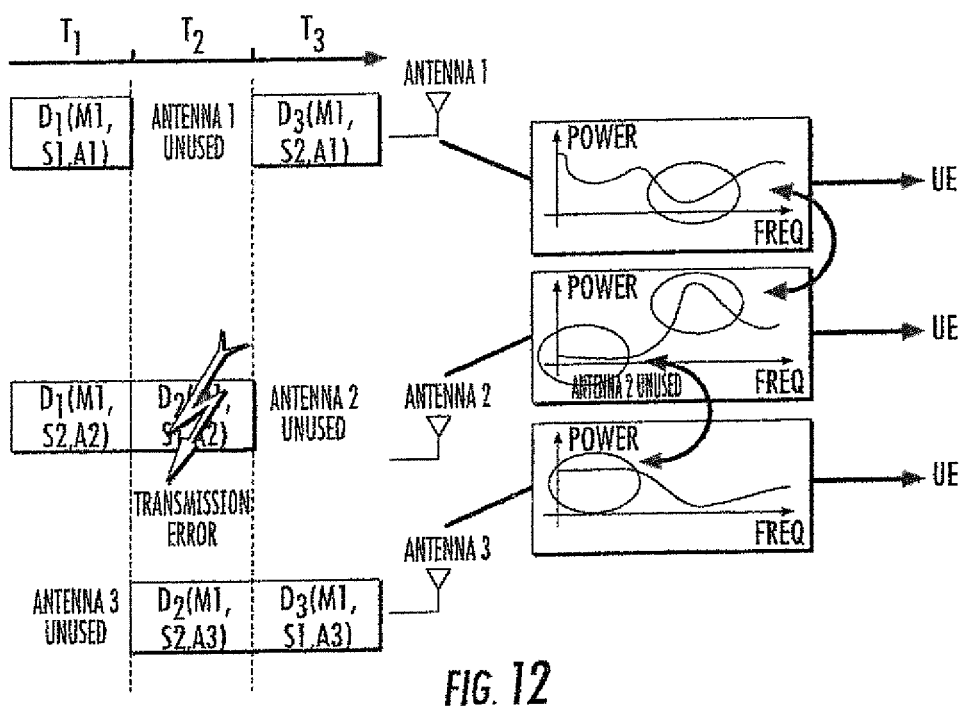
FIG. 12 is a graphical illustration of one embodiment of a technique for initial transmission of data using a chase-combining approach in accordance with the invention.
Figure 13:
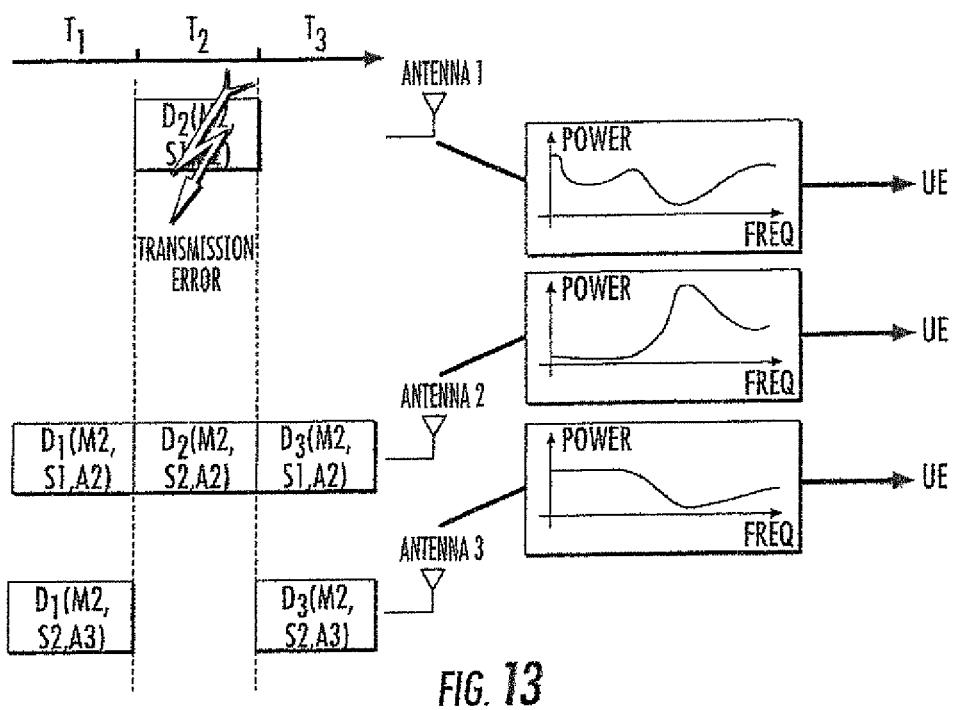
FIG. 13 is a graphical illustration of one embodiment of a technique for retransmission of data according to a chase-combining approach.
Figure 14:
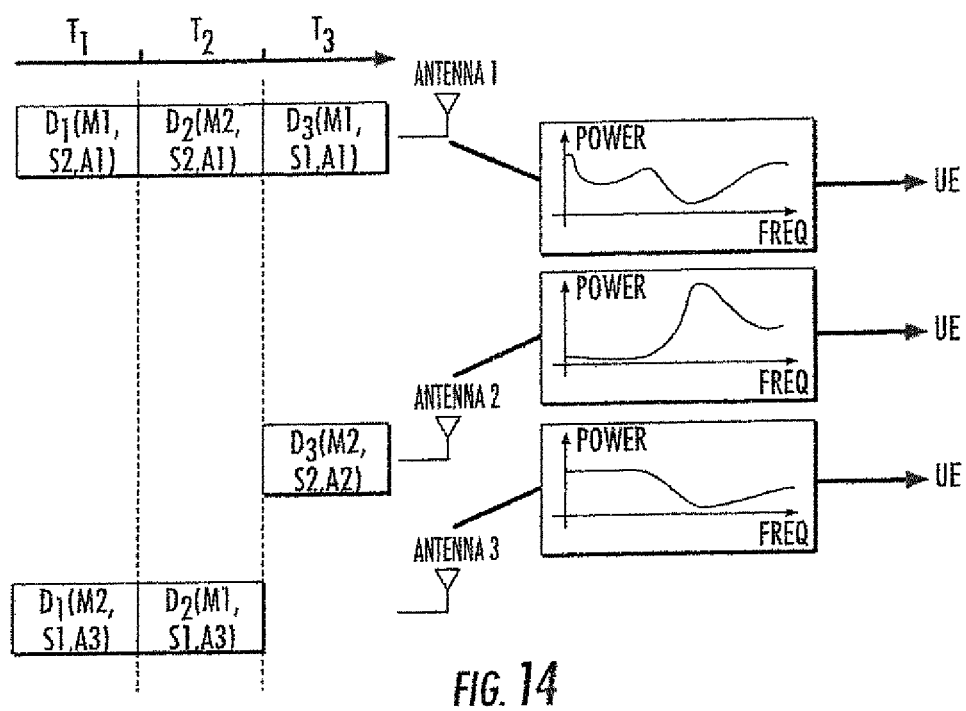
FIG. 14 is a graphical illustration of one embodiment of a technique for a second retransmission of data according to a chase combining approach.

Referring now to FIGS. 12-14, several exemplary permutation pattern examples are shown and described in detail. FIGS. 12-14 describe a transmission, a first retransmission, and a second retransmission, respectively, although it will be appreciated that more or less transmission/retransmission steps may be used consistent with the invention.

At FIG. 12, an initial transmission is illustrated. It is assumed in the example of FIG. 12 that a transmission error occurs at the second time interval on antenna 2 (i.e. $D_2$ ($M_1$, $S_1$, $A_2$)). It is further assumed that only one CRC is available for all six (6) data packets shown in FIG. 12. That is, the receiver cannot actually identify the erroneous data packet and therefore must request the retransmission of all six (6) packets. It should be noted that in implementations in which the CRC is attributed to a smaller number of data packets, the location of the error can be narrowed down further, and only the retransmission of the corresponding data sub-set is required. The methodology starts with the first re-transmission of the data, maximizing the diversity by: (1) Permuting the data-bit/constellation-bit mappings (those bits that were on bits with less power at the first transmission are now on bits with more power on the second transmission); and simultaneously (2) permuting the stream/antenna mapping.

In open loop embodiments, the transmitter is unaware of the channel state information and must select diversity elements based on generalized algorithms. For example, the retransmission diversity can be maximized in the transmitter to select diversity schemes which maximally change the greatest number of the available degrees of freedom. In some cases the transmitter may more heavily weight certain types of diversity. For instance, the effects of constellation diversity on any single received bit may be computationally simple, but relatively weak in comparison to antenna hopping, and coding diversity. In some implementations, the transmitter may infer the effects of aggregate diversity schemes at the receiver, and adjust its transmission accordingly.

In closed loop approaches, the transmitter is aware of one or more aspects of channel state information, and selects diversity elements based on targeted algorithms. For example, the transmitter may receive a channel estimate or determine the received signal-to-noise ratio (SNR) at the receiver, and adjust its retransmission to optimize the overall system performance (e.g. optimize for received SNR, etc.). For example, in one variant, the transmitter might assume that the receiver will combine the initial transmission with each retransmission by a "Maximum Ratio Combining" approach as described in "*Multiuser Detection*", by Sergio Verdú (Author), Cambridge University, ISBN-13: 978-0521593731, 1998, the contents of which are incorporated herein by reference in its entirety. Taking this SNR calculation into account, the transmitter chooses the permutation pattern for the available degrees of freedom such that a maximum SNR is observed in the receiver if the initial transmission and all retransmissions are suitably combined.

Referring now back to the illustrated embodiments of FIGS. 12-14, FIG. 12 illustrates the respective "peaks" and "troughs" of the channel impulse response experienced by each antenna. By cumulatively summing diversity paths which are sufficiently "uncorrelated", the overall channel impulse response "flattens". Consequently, a first retransmission (in case of error) may thus look as follows as seen in FIG. 13. This first retransmission will allow the receiver to combine the received signals of the first transmission and the first retransmission. The error probability is then expected to be considerably decreased; however a transmission error still remains possible as has been illustrated in FIG. 13. Using an antenna hopping diversity scheme, the transmission of the various data blocks occur at different antennas compared to the first initial transmission. For example, the data block $D_1$ ($M_1$, $S_1$, $A_1$) as illustrated in FIG. 13 is retransmitted on a different antenna with an alternate constellation mapping (i.e. the first transmission is on antenna $A_1$ with constellation mapping $M_1$, while the retransmission is on $A_2$ with constellation mapping $M_2$). Consequently, carriers that were strongly attenuated on $A_1$ are now likely to be received with a better quality on $A_2$. A combination of both (i.e., the initial transmission followed by the re-transmission) will thus improve the error resistance of the scheme.

In the foregoing illustrated embodiment, antenna hopping diversity assumes that only a subset of the available transmission antennas are used simultaneously. This is typically the case in applications where the number of power amplifiers and required RF-Front-End components are limited. If all antennas are always used, then a "Stream/Antenna Permutation" (see FIG. 9) may be a desirable alternative to the antenna hopping diversity approach discussed above. The resulting effects are similar, but the additional diversity of antenna hopping is typically higher and thus leads to better system performance.

Varying protection levels for constellation bits within higher order modulation schemes (e.g. 16-QAM, 64-QAM, 256-QAM, 1024-QAM, etc.) can be used to improve constellation-bit mapping diversity. For example, the first data block $D_1$ ($M_1$, $S_1$, $A_1$) (illustrated in FIG. 12) is transmitted using a first bit-assignment strategy "$M_1$". In the retransmission case as illustrated in FIG. 13, a second bit assignment strategy "$M_2$" is used. The remapping increases constellation diversity—i.e. those data bits that were previously mapped onto constellation bits with higher (lower) average power are now mapped onto constellation bits with lower (higher) average power. A combination of both received signals (i.e. the initial transmission and the retransmission) will improve the error resistance of the scheme. While two "maximal" mappings are described, it is appreciated that in some embodiments, more mappings may be used, each of which provides incrementally more information. For example, one such additional bit assignment may be "$M_3$" useful in higher order constellations. In another example, a data scrambling scheme may be implemented at retransmission prior to the mapping, where the scrambling scheme is already known to both the transmitter and the receiver.

Referring now to FIG. 14, the remaining permutations are transmitted in the second retransmission to optimize signal flattening. A receiver which can combine the first transmission (see FIG. 12), with a first retransmission (see FIG. 13), and a second retransmission (FIG. 14) is exposed to all the permutations of antennas and bit mappings for each of the data streams. The various data packets have each been transmitted on different antennas and at differing power levels (e.g., constellation mappings). In an exemplary embodiment, the receiver will have received all data packets from all three (3) of the antennas after the $2^{nd}$ retransmission (i.e., in the first transmission the first data packet of the first stream $D_1$ ( ..., $S_1$, ... ) was transmitted on antenna $A_1$ as illustrated in FIG. 12; in the first retransmission it is transmitted on antenna $A_2$ as illustrated in FIG. 13 and in the second retransmission on antenna $A_3$ as illustrated in FIG. 14). Furthermore, the receiver will have received all data packets in each of the constellation mappings (i.e., in the first transmission the first data packet of the first stream $D_1$ ( ..., $S_1$, ... ) was mapped with mapping $M_1$ as illustrated in FIG. 12; in the first retransmission it was mapped with mapping $M_2$ as illustrated in FIG. 13 and in the second retransmission mapped with mapping $M_2$ as illustrated in FIG. 14).

It is appreciated that the cumulative transmissions of FIGS. 12-14 are intelligently selected to maximize the possible spread of permutations. Accordingly, the combination of all permutations will enable the receiver to maximally flatten the frequency selective channel impulse responses between the transmitter and receiver. Consequently, the system performance is expected to be considerably improved.

If further retransmissions are required, the permutation pattern for all available degrees of freedom can be changed each lime in order to guarantee a maximum level of diversity. It is also appreciated that subsequent retransmissions may not be necessary if the data is valid in earlier transmissions. Therefore a careful balance should be struck between having too many or too few permutations. In practical terms, having too many permutation possibilities can lead to unnecessary system overhead. For example, in antenna diversity, permutations are based on the number of antennas, each of which has hardware and software drawbacks. The benefit of having more antennas diminishes with each additional antenna. Conversely, a system with too few permutation possibilities is not desirable. In an under-realized system, each transmission must be overly robust, requiring more resources to decode the data streams than is strictly necessary.

While the scheme illustrated in FIGS. 12-14 is, for reasons of simplicity, shown in a HARQ chase combining context (i.e., the data bits do not change from one transmission to subsequent retransmissions), it is appreciated that the principles described herein could readily be used in or combined with incremental redundancy or other channel coding permutation contexts. For example, in one exemplary incremental redundancy context, data puncturing may be used to add an additional level of diversity in the permutation process. Recall that it had previously been assumed that only one CRC is available for all six (6) data packets (three (3) data packets for two (2) streams) shown in FIG. 12, and that errors in data packets required the retransmission of all six (6) packets. In an incremental redundancy approach, supplemental retransmissions may have "new" information (i.e., previously punctured bits are now included).

For example, in one embodiment, a ½ rate convolutional encoder generates two output bits b(i,1), b(i,2) for each input bit b(i). For any given six (6) packets, only three (3) of these packets are actually needed in order to re-create the original six (6) packets of data. The receiver requires one of the output bits (either b(i,1) or b(i,2)) to re-create the corresponding input bit. Similarly, for other code rates, the selection of retransmission bits is adapted accordingly, e.g., for a ⅓ rate code, one of the three output bits must be correctly received, etc.

Accordingly, an incremental redundancy scheme would only transmit three (3) of the original six (6) packets of data initially. If the initial transmission is received and correctly decoded, then the next set of data is transmitted. If the initial transmission fails, then remaining portions of the data are retransmitted in the first retransmission. If the first retransmission fails as well, then a second retransmission may resend packets selected from the first and second three packets.

Furthermore, while puncturing is contemplated for use with convolutional codes, it is appreciated that a wide variety of other codes in the communications arts are adapted for use in lossy channels. As used herein, convolutional coding schemes are analogous to any error correction code. Other common examples of error correction schemes include Low Density Parity Check (LDPC) codes, Erasure codes, Hamming codes, etc.

Figure 15:
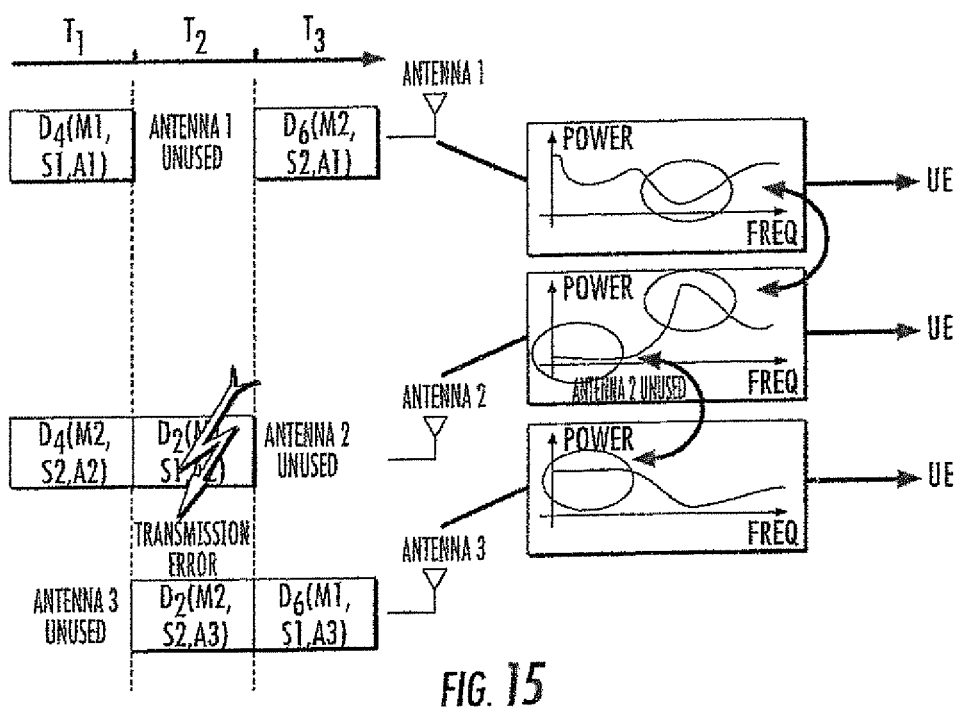
FIG. 15 is a graphical illustration of one embodiment of a technique for an initial transmission of data according to an incremental redundancy approach.
Figure 16:
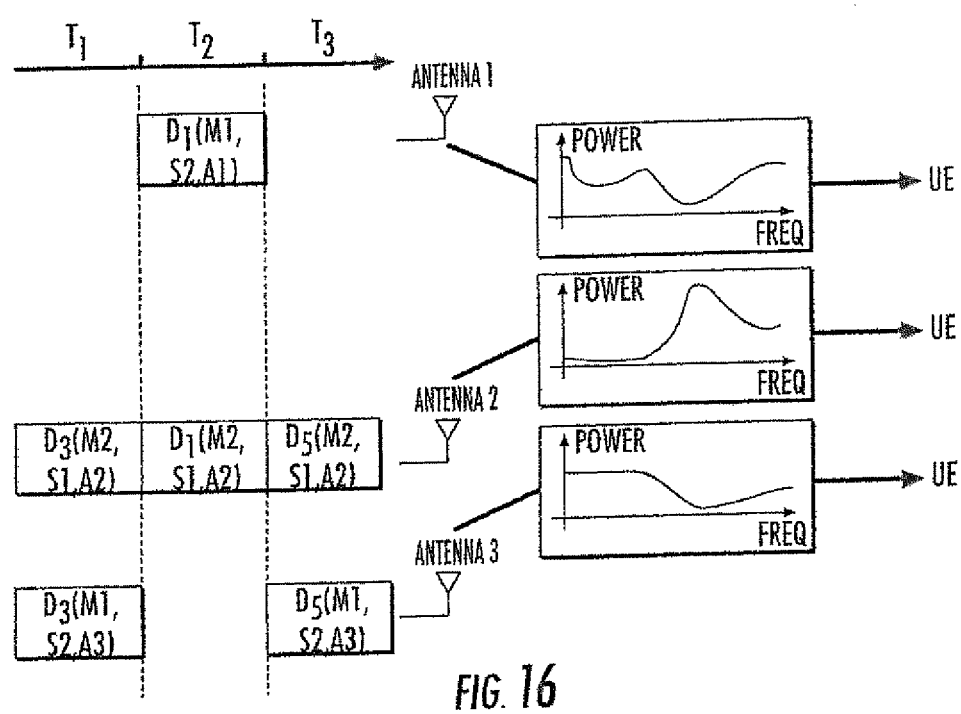
FIG. 16 is a graphical illustration of one embodiment of a technique for an initial retransmission of data according to an incremental redundancy approach.

FIGS. 15-16 illustrate this exemplary incremental redundancy permutation approach. Here it is assumed that for any given six (6) packets (i.e. "$D_1$", "$D_2$", "$D_3$", "$D_4$", "$D_5$" and "$D_6$"), only three (3) of these packets needs to be decoded in any given stream ("$S_1$", "$S_2$") in order for all six (6) data packets to be known to the receiver. FIG. 15 illustrates an initial transmission in which data packets "$D_2$", "$D_4$" and "$D_6$" are transmitted. A transmission error occurs at "$D_2$ ($M_1$, $S_1$, $A_2$)". However, unlike the "chase combining" based approach illustrated in FIGS. 12-14 in which "$D_2$", "$D_4$" and "$D_6$" would be re-transmitted, FIG. 16 introduces an extra level of diversity by re-transmitting "$D_1$", "$D_3$" and "$D_5$" instead of "$D_2$", "$D_4$" and "$D_6$".

Furthermore, multiple variations on data puncturing or coding permutation are suitable for use with the invention within the constraints of the coding scheme. For example, puncturing may be performed in an "every other subframe" fashion (as shown in FIG. 16), or puncturing may be performed on a first half, second half ($D_1$, $D_2$, $D_3$ for initial transmission $D_4$, $D_5$, $D_6$ for the retransmission), or even a random ordering ($D_1$, $D_2$, $D_4$ for a first transmission, $D_3$, $D_5$, $D_6$ for the retransmission), etc. Accordingly, a wide variety of data puncturing diversity schemes is possible. The use of multiple iterations of data puncturing will have a cumulatively "averaging" effect at the receiver, improving the probability that subsequent retransmissions will be successful. It should be recognized that while FIGS. 12-16 are discussed in the context of a transmitter with three (3) antennas, more or less antennas could be utilized without departing from the invention. For example, as few as two antennas could be used, and any reasonable number of antennas larger than three could be utilized as well, depending on for example the level of robustness of transmission diversity needed in the system and other practical system-limitations such as size and power.

Many possibilities exist for combining the various degrees of freedom between subsequent transmissions (e.g., transmit antenna selection, mapping of data-bits onto constellation bits of distinct power levels, etc.). In an exemplary embodiment, cyclic antenna switching combined with the switching of data-bit/constellation bit mapping is utilized. In this case, the data streams $S_1$, $S_2$, etc. are mapped onto antennas $A_1$, $A_2$, etc. at the initial transmission. At the first retransmission, the data streams $S_1$, $S_2$, etc. are mapped onto antennas $A_2$, $A_3$, etc. If the last antenna is reached, the next switching step will go back to antenna $A_1$ again. Simultaneously, the data-bit/constellation-bit mapping strategy is also changed. Typically, Stream $S_1$ is sent using the mapping $M_1$, Stream $S_2$ is sent using $M_2$, etc. for the initial transmission. At the first retransmission, the mapping $M_2$ is used for Stream $S_1$ and $M_1$ for Stream $S_2$, etc.

In an alternative embodiment, the above approach is utilized in combination with a permutation offset. In this case, the approach is similar to the embodiment described above, with the only difference being that the cyclic antenna mapping starts with an antenna other than antenna number $A_1$, and/or the mapping starts with a mapping scheme different than mapping scheme $M_1$. Such an embodiment may be useful with "moving" transmissions, where the permutation selection cycles independently of the data transmission/retransmission.

In yet another embodiment, the data-bit/constellation bit mapping permutation approach is used alone. In an exemplary implementation, Stream $S1$ is sent using the mapping $M_1$, Stream $S_2$ is sent using $M_2$, etc. for the initial transmission. At the first retransmission, the mapping $M_2$ is used for Stream $S_1$ and $M_1$ for Stream $S_2$, etc.

In yet a further embodiment, the initial selection of transmit antennas and data-bit/constellation-mapping is performed randomly (e.g., according to a pseudo-random sequence generator).

In yet another embodiment, at each transmission or subsequent transmission, the new selection of transmitting antennas and data-bit/constellation-mapping is performed randomly (as opposed to the cyclical approach illustrated in FIGS. 12-14). In other embodiments, it may be desirable to stage the permutations such that each permutation should lead to no (or to a minimum) amount of overlapping compared to previous transmissions and or subsequent transmissions. Accordingly, it is appreciated that any number of suitable alternative embodiments utilizing the previously discussed diversity mechanisms (or in fact others) could be used in place of those specific embodiments described herein.

As previously noted, in yet other embodiments, the mapping or permutation schemes referenced above are applied not in the context of a retransmission, but rather as part of an initial transmission (i.e., "proactive" permutation or mapping). This approach may be implemented for example according to a prescribed diversity scheme or plan as opposed to being instituted in response to a received indication of an error.

Exemplary Serving Base Station Apparatus—

Figure 17:
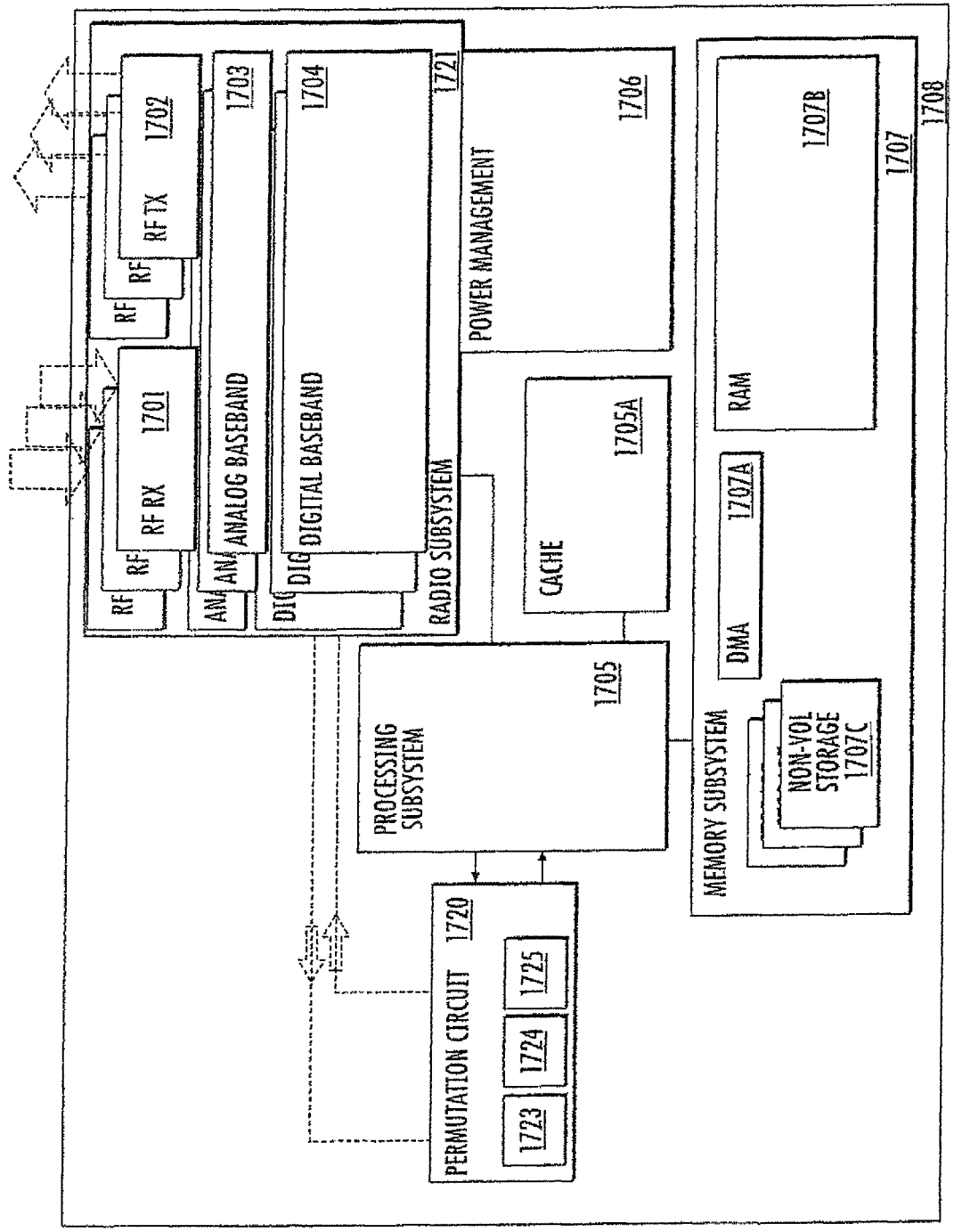
FIG. 17 is a functional block diagram illustrating one embodiment of a serving base station apparatus adapted to implement the methods of the invention.

Referring now to FIG. 17, one embodiment of a serving base station apparatus 400 implementing the methods of the present invention is illustrated. The base station apparatus includes one or more substrate(s) 1708 that further include one or more integrated circuits including a processing subsystem 1705 such as a digital signal processor (DSP), microprocessor, gate array, or multiple ones of processing components, as well as a power management subsystem 1706 that provides power to the base station 400. As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the term "computer program" or "software" is meant to include any sequence or human or machine cognizable steps which perform a function. The processing subsystem 1705 may include one or more processors (or multi-core processor(s)). Additionally, the processing subsystem may also include a cache 1705A to facilitate processing operations.

The radio subsystem 1721 may, in an exemplary embodiment, include one or more subsections comprising a: digital baseband(s) 1704, analog baseband(s) 1703, as well as RF components for multiple RX 1701 and TX 1702. While a single radio subsystem is illustrated, it is appreciated that future developments may consolidate the radio subsystem, in whole or in part with other radio subsystems, as in multi-mode operation. Furthermore, while it is appreciated that some aspects of the invention would be advantageously handled within a single device, it is appreciated that multiple devices could be utilized.

The embodiment of the apparatus 400 shown in FIG. 17 includes a permutation circuit 1720 configured to configure the multi-dimensional permutations for each transmission. The permutation circuit may be implemented in software, hardware or a mixture of both which is, in an exemplary embodiment, incorporated within the radio subsystem 1721. Alternatively, the permutation circuit is incorporated within the processing subsystem 1705 or as a separate discrete component or integrated circuit. In one embodiment, the permutation circuit is implemented in the digital baseband processing unit 1704, where the digital signal processing for the physical layer is performed. In one variant, antenna control may be performed at the RF front end, and may be controlled by the baseband component.

The permutation circuit 1720 further includes the initial transmission determination 1723 circuit, the error detection circuit 1724 and a multi-dimensional permutation subsystem 1725. The initial transmission determination subsystem is responsible for determining the initial parameters chosen during initial transmission. The particular make up of this subsystem is dependent on whether the system is an open-loop or closed-loop system as previously described above. If a closed-loop system, the subsystem includes one or more network interfaces to module(s) responsible for estimating reception characteristics at the receiver. The error detection subsystem is substantially as is known in the prior art for detecting when retransmission of data packets would be required. The multi-dimensional permutation subsystem determines how to permute the initial transmission parameters (as described previously above) so as to boost system performance.

The processing subsystem 1705 is preferably connected to a memory subsystem 1707. In an exemplary embodiment, the memory subsystem includes a direct memory access (DMA) 1707A, operational random access memory (RAM) 1707B, and non-volatile memory 1707C.

Exemplary UE Apparatus—

Figure 18:
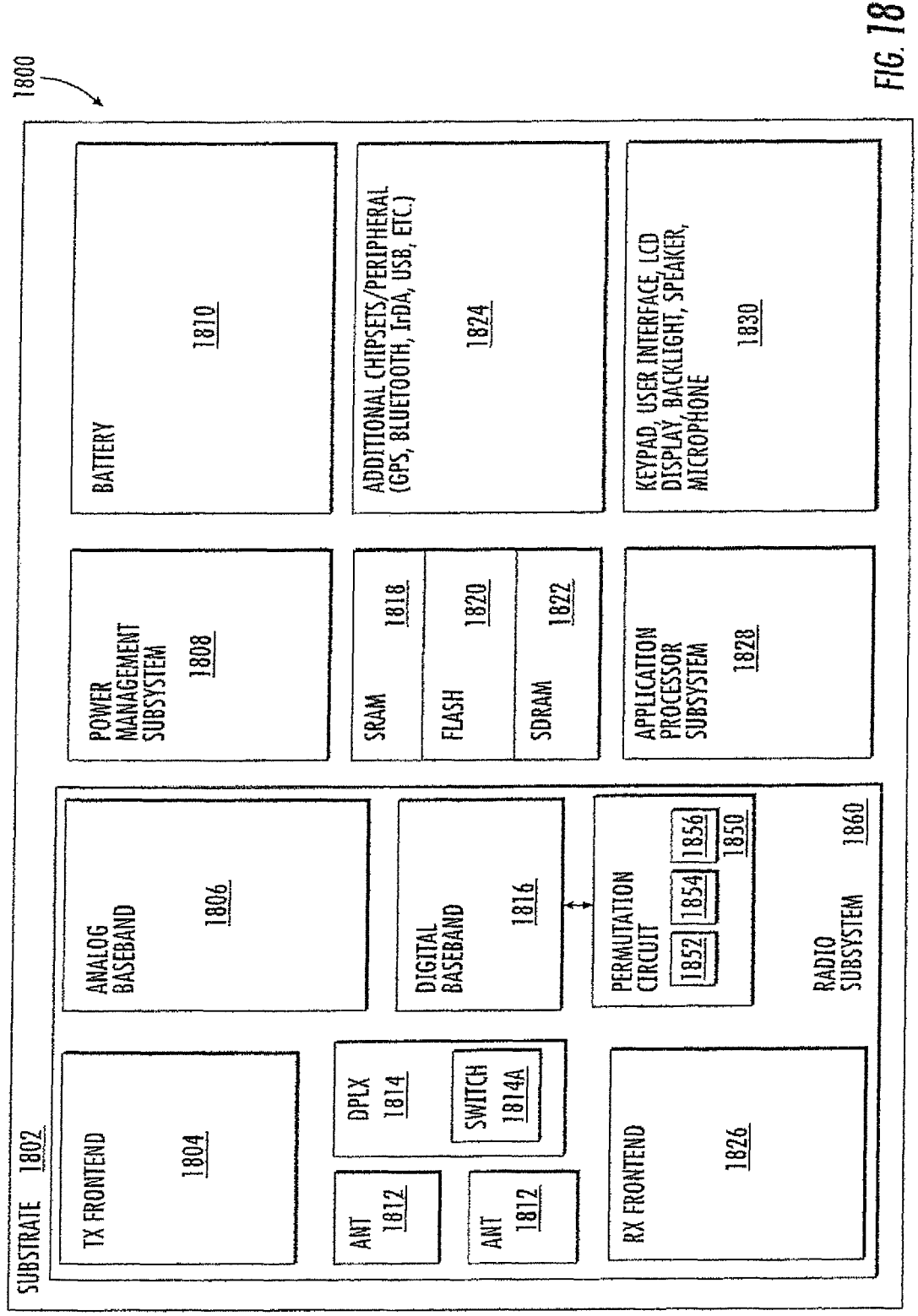
FIG. 18 is a functional block diagram illustrating one embodiment of a UE apparatus adapted to implement the methods of the invention.

Referring now to FIG. 18, one embodiment of a client or UE apparatus 450 implementing the methods of the present invention are illustrated. The apparatus shown might take the form of, inter alia, a UE such as a portable computer or mobile communications device. The UE apparatus includes an application processor subsystem 1828 such as a digital signal processor, microprocessor, field-programmable gate array, or multiple ones of processing components mounted on one or more substrates 1802. The processing subsystem may also include an internal cache memory. The processing subsystem 1828 is connected to a memory subsystem comprising memory which may for example; include SRAM 1818, flash 1820 and SDRAM 1822 components. The memory subsystem may implement one or a more of DMA type hardware, so as to facilitate data accesses, as is well known in the art.

Similar to that described above with respect to FIG. 17, the permutation circuit 1850 includes additional subsystems for initial transmission determination 1852, error detection 1854, and multi-dimensional data permutation subsystem 1856. These subsystems may be implemented in software, hardware or a mixture of both. In an exemplary embodiment, the permutation circuit is implemented within the radio subsystem 1860. Alternatively, the permutation circuit is integrated within the processing subsystem 1828, or even as a separate component or integrated circuit (IC).

The radio subsystem 1860 includes, in an exemplary embodiment, a digital baseband 1816, analog baseband 1806, RX front-end 1826 and TX front-end 1804. The apparatus 1650 further includes, in the embodiment illustrated, a MIMO antenna assembly 1812 and duplex component 1814; the duplexing component may include a simple switch 1814A for switching between antenna operations. The switch 1814A may also include a discrete component. While specific architecture is discussed, in some embodiments, some components may be obviated or may otherwise be merged with one another (such as RF RX, RF TX and analog baseband combined, as of the type used for 3G digital RFs) as would be appreciated by one of ordinary skill in the art given the present disclosure.

The Analog Baseband 1806 controls operation of the radio front ends and converts a digital signal (input from the digital baseband modem 1816) to an analog representation for transmission. Therefore, the digital baseband modem 1816 loads the analog baseband 1806, with scheduling parameters for the upcoming frame. The duplexing component 1814 may include a simple switch 1814A the control of duplex operation or switch operation being controlled by the analog baseband 1806. The control of TX and RX front ends are also controlled by the analog baseband 1806.

A combination duplexer and switch component provides a benefit in terms of both board space and interfaces; however, it may not always be possible to combine these components, due to design issues, such as reverse compatibility or cost of redesign. The duplexer may be powered off when the UE is operating using the switching mechanism, thereby saving power consumption via obviating the costly duplexing operation. Powering off the duplexer is not necessary for operation, and may be ignored e.g., for systems which are not concerned with power management, or are otherwise unable to toggle power to the duplexer.

A UE using a simple analog baseband 1806 which is unable to support half-duplex operation may still be required to implement half-duplex operation using general purpose I/Os (e.g., software activated switch) to control switching, so as to enable other UE on the network to operate in half-duplex. Due to the incompatibility of half-duplex operation with full-duplex operation, any UE incapable of operating in half-duplex would necessarily disable half-duplex operation for the entire community of UEs. Therefore, in some embodiments, the control for switching may be implemented in a separate interface from the duplexer on the analog baseband 1806. In one embodiment, the simple switch 1814A may be a separate assembly with a separate control mechanism controlled by the analog baseband 1806. In other embodiments, the digital baseband 1816 may need to directly control the duplexer/switch assembly, such a scheme may not be preferable for the UE, but may be implemented for the benefit of other UE's within the network.

The illustrated power management subsystem (PMS) 1808 provides power to the UE, and may include an integrated circuit and or multiple discrete electrical components. In one exemplary portable UE apparatus, the power management subsystem 1808 advantageously interfaces with a battery 1810.

The user interface system 1830 includes any number of well-known I/O including, without limitation: a keypad, touch screen, LCD display, backlight, speaker, and/or microphone. However, it is recognized that in certain applications, one or more of these components may be obviated. For example, PCMCIA card type or wireless dongle UE embodiments may lack a user interface (as they could piggyback onto the user interface of the device to which they are physically and/or electrically coupled).

The apparatus 450 further includes optional additional peripherals 1824 including, without limitation, one or more GPS transceivers, or network interfaces such as IrDA ports, Bluetooth transceivers, USB, FireWire, etc. It is however recognized that these components are not necessary for operation of the UE in accordance with the principles of the invention.

It will be appreciated that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A method for permuting data in a wireless network, the method comprising:
   transmitting a first plurality of data packets permutated according to a first permutation scheme;
   receiving an indication related at least in part to a first transmission;
   permuting a second plurality of data packets according to a multi-dimensional permutation scheme;
   transmitting the second permuted plurality of data packets;
   upon receiving a further indication related at least in part to a second transmission, permuting a further plurality of data packets according to a further multi-dimensional permutation scheme, wherein the further multi-dimensional permutation scheme is selected based on maximizing one or more diversity dimension differences between the first permutation scheme and the multi-dimensional permutation scheme; and
   transmitting the further permuted plurality of data packets.

2. The method of claim 1, wherein the multi-dimensional permutation scheme is selected based at least in part on the first permutation scheme.

3. The method of claim 2, wherein the multi-dimensional permutation scheme is further selected based at least in part on the received indication.

4. The method of claim 1, wherein the received indication comprises an indication of an error in the first transmission of the first plurality of data packets, and the further indication comprises an indication of an error in the second transmission of the second plurality of data packets.

5. The method of claim 4, wherein the second plurality of data packets comprises at least a portion of the first plurality of data packets.

6. The method of claim 1, wherein the first and multi-dimensional permutations schemes are selected from a group consisting of: (i) an antenna diversity scheme, and (ii) a constellation bit-mapping scheme.

7. The method of claim 1, wherein the multi-dimensional permutation scheme maximizes one or more diversity dimension differences between the first and the second plurality of data packets.

8. A wireless communication apparatus comprising:
   a processor;
   a plurality of antenna elements in data communication with the processor; and
   logic in data communication with the processor and the plurality of antenna elements,
      the logic configured to cause the wireless communication apparatus to transmit a first and second plurality of data packets accordingly to a multi-dimensional permutation comprising at least a first and a second permutation scheme for transmission over the plurality of antenna elements,
      the logic further configured to cause the wireless communication apparatus to, upon receiving an indication related at least in part to the transmission, transmit a further plurality of data packets according to a further multi-dimensional permutation scheme, wherein the further multi-dimensional permutation scheme is selected based on maximizing one or more diversity dimension differences between the first and second permutation schemes and the multi-dimensional permutation scheme.

9. The wireless communication apparatus of claim 8, wherein the second permutation scheme is selected based at least in part on the first permutation scheme.

10. The wireless communication apparatus of claim 8, wherein:
    the logic is further configured to receive an indication of an error in the transmission of the first plurality of data packets; and
    the second plurality of data packets comprises at least a portion of the first plurality of data packets.

11. The wireless communication apparatus of claim 10, wherein the second permutation scheme is selected based at least in part on the indication of the error.

12. The wireless communication apparatus of claim 8, wherein the multi-dimensional permutation comprises an antenna diversity permutation in combination with a constellation-bit mapping permutation.

13. The wireless communication apparatus of claim 8, wherein the wireless communication apparatus comprises a base station apparatus.

14. The wireless communication apparatus of claim 8, wherein the wireless communication apparatus comprises user equipment configured for communication with at least a cellular network.

15. A computer readable apparatus having a non-transitory storage medium with at least one computer program stored thereon, the at least one computer program configured to, when executed, cause a wireless device to:
    initiate an initial transmission of a first one or more data packets across a wireless communication link;
    permute a second one or more data packets according to a multi-dimensional permutation scheme;
    initiate a second transmission of the permutated second one or more data packets across the wireless communication link;
    upon receiving a further indication related at least in part to a second transmission, permute a further plurality of data packets according to a further multi-dimensional permutation scheme, wherein the further multi-dimensional permutation scheme is selected based on maximizing one or more diversity dimension differences of the multi-dimensional permutation scheme; and transmit the further permuted plurality of data packets across the wireless communication link.

16. The computer readable apparatus of claim 15, wherein:

the first one or more data packets are permutated according to an initial permutation scheme prior to the initial transmission; and the multi-dimensional permutation scheme is selected based at least in part on the initial permutation scheme.

17. The computer readable apparatus of claim 15, wherein the at least one computer program is further configured to, when executed, cause the wireless device to receive an indication of whether the initial transmission was successful;

wherein the multi-dimensional permutation scheme is selected based at least in part on the indication.

18. The computer readable apparatus of claim 15, wherein the multi-dimensional permutation comprises an antenna diversity permutation in combination with a constellation-bit mapping permutation.

19. The computer readable apparatus of claim 17, wherein when the indication comprises an unsuccessful data transfer of at least a portion of the first one or more packets, the second one or more data packets comprise at least the portion of the first one or more packets.

20. The computer readable apparatus of claim 17, wherein the multi-dimensional permutation scheme is configured to maximize one or more diversity dimension differences between the first and the second one or more data packets.

* * * * *